US012672663B2

(12) United States Patent
Geller et al.

(10) Patent No.: US 12,672,663 B2
(45) Date of Patent: Jul. 7, 2026

(54) STABILIZED SEMISOLID FOOD PRODUCTS

(71) Applicant: CREAMCOL LTD, Afula (IL)

(72) Inventors: Irena Geller, Afula (IL); Tomer Geller, Afula (IL)

(73) Assignee: CreamCol Ltd, Afula (IL)

( * ) Notice: Subject to any disclaimer, the term of this patent is extended or adjusted under 35 U.S.C. 154(b) by 997 days.

(21) Appl. No.: 17/428,185

(22) PCT Filed: Feb. 24, 2020

(86) PCT No.: PCT/IL2020/050203
§ 371 (c)(1),
(2) Date: Aug. 3, 2021

(87) PCT Pub. No.: WO2020/170258
PCT Pub. Date: Aug. 27, 2020

(65) Prior Publication Data
US 2022/0022509 A1    Jan. 27, 2022

(30) Foreign Application Priority Data

Feb. 24, 2019    (IL) ......................................... 265005

(51) Int. Cl.
A23L 29/206 (2016.01)
A23C 19/076 (2006.01)
(Continued)

(52) U.S. Cl.
CPC .......... A23L 29/206 (2016.08); A23C 19/076 (2013.01); A23C 19/093 (2013.01);
(Continued)

(58) Field of Classification Search
CPC ... A23L 29/206; A23C 19/076; A23C 19/093; A23G 1/44; A23G 9/04; A23G 9/38; A23G 9/40; C12G 3/005; A23V 2002/00
See application file for complete search history.

(56) References Cited

U.S. PATENT DOCUMENTS 2,395,061 A    2/1946   Musher
4,018,901 A    4/1977   Hayward et al.
(Continued)

FOREIGN PATENT DOCUMENTS

EP    0261616 A2    3/1988
EP    0268097 A1    5/1988
(Continued)

OTHER PUBLICATIONS

Renard et al., "Structural investigation of β-lactoglobulin gelation in ethanol/water solutions". International Journal of Biological Macromolecules 26 (1999) 35-44. (Year: 1999).*
(Continued)

*Primary Examiner* — Erik Kashnikow
*Assistant Examiner* — Assaf Zilbering

(57)    ABSTRACT
The invention relates to compositions and methods for stabilizing and enhancing the viscosity of semisolid compositions, and to the production of stabilized alcohol-containing semisolid food products. More specifically, embodiments of the invention relate to novel stabilizers for semisolid compositions, to alcohol-containing semisolid food compositions comprising them, and to processes for the preparation and use thereof. Further, the invention in embodiments thereof provides non-liquid food products containing a high alcohol content, which are stable at room temperature and do not necessitate the use of gelling agents or other chemical stabilizers.

8 Claims, 6 Drawing Sheets

(51) Int. Cl.

| | | |
|---|---|---|
| A23C 19/093 | (2006.01) | |
| A23G 1/44 | (2006.01) | |
| A23G 9/04 | (2006.01) | |
| A23G 9/38 | (2006.01) | |
| A23G 9/40 | (2006.01) | |
| C12G 3/005 | (2019.01) | |

(52) U.S. Cl.

CPC ................. *A23G 1/44* (2013.01); *A23G 9/04* (2013.01); *A23G 9/38* (2013.01); *A23G 9/40* (2013.01); *C12G 3/005* (2013.01); *A23V 2002/00* (2013.01)

(56) References Cited

U.S. PATENT DOCUMENTS

| | | | |
|---|---|---|---|
| 4,790,999 | A | 12/1988 | Ashmont et al. |
| 4,943,443 | A | 7/1990 | Evers |
| 4,988,529 | A | 1/1991 | Nakaya et al. |
| 5,019,414 | A | 5/1991 | Valdes |
| 7,981,456 | B2 | 7/2011 | Leibovich et al. |
| 9,392,808 | B2 | 7/2016 | Melvin |
| 2001/0002269 | A1 | 5/2001 | Zhao |
| 2001/0041208 | A1 | 11/2001 | Orris et al. |
| 2003/0134007 | A1 | 7/2003 | Donhowe |
| 2003/0215548 | A1 | 11/2003 | Mihajlovic |
| 2007/0148305 | A1 | 6/2007 | Sherwood et al. |
| 2007/0148324 | A1 | 6/2007 | Lin et al. |
| 2008/0050498 | A1 | 2/2008 | Sherwood et al. |
| 2009/0136643 | A1 | 5/2009 | Bovetto et al. |
| 2009/0148582 | A1 | 6/2009 | Leibovich et al. |
| 2012/0128854 | A1 | 5/2012 | Melvin et al. |
| 2014/0205729 | A1 | 7/2014 | Didzbalis et al. |
| 2015/0305390 | A1 | 10/2015 | Vrljic et al. |
| 2016/0302444 | A1 | 10/2016 | Melvin |
| 2017/0251694 | A1 | 9/2017 | Langley |
| 2018/0110237 | A1 | 4/2018 | Isaacs et al. |

FOREIGN PATENT DOCUMENTS

| | | | | | |
|---|---|---|---|---|---|
| EP | | 2880996 | | 6/2015 | |
| EP | | 3042565 | A1 | 7/2016 | |
| RU | | 2218805 | C1 | 12/2003 | |
| WO | | 9715199 | A1 | 5/1997 | |
| WO | | 0042862 | A1 | 7/2000 | |
| WO | WO-2011144214 | A1 * | 11/2011 | ............. A21D 13/22 | |
| WO | | 2017006221 | A1 | 1/2017 | |
| WO | WO 2020/170258 | | | 8/2020 | |
| WO | WO 2020/170259 | | | 8/2020 | |

OTHER PUBLICATIONS

Ahmed "Hydrogel: Preparation, characterization, and applications: A review". Journal of Advanced Research (2015) 6, 105-121. (Year: 2015).*

Nikolaidis et al., (2017) Effect of heat, pH, ultrasonication and ethanol on the denaturation of whey protein isolate using a newly developed approach in the analysis of difference—UV spectra. Accepted Manuscript. Food Chem doi: http://dx.doi.org/10.1016/j.foodchem.2017.04.022; 28 pages. Published in final and edited version as: Food Chem 232: 425-433.

Vilela et al., (2018) Emulsions, Foams, and Suspensions: The Microscience of the Beverage Industry. Beverages 4(2): 25; 16 pages.

Internet archive Wayback Machine Aug. 20, 2015 capture of the Molecular recipes web page. Retrieved from the Internet: https://web.archive.org/web/20150820002349/http://www.molecularrecipes.com/ice-cream-class/perfect-ice-cream-base/ [retrieved on May 16, 2020]; Aug. 20, 2015 (Aug. 20, 2015). 4 pages.

International Search Report for PCT/IL2020/050203, mailed May 27, 2020 (8 pages).

Written Opinion of the International Searching Authority for PCT/IL2020/050203, mailed May 27, 2020 (4 pages).

Chandan and Kilara (2016) Dairy-Based Ingredients. In: Dairy Processing and Quality Assurance, second edition. Chandan R, Kilara A and Shah NP (eds.). Published by John Wiley & Sons, Ltd. pp. 197-219 (23 pages).

International Preliminary Report on Patentability Dated Sep. 2, 2021 From the International Bureau of WIPO Re. Application No. PCT/IL2020/050203 (6 Pages).

International Preliminary Report on Patentability Dated Sep. 2, 2021 From the International Bureau of WIPO Re. Application No. PCT/IL2020/050204 (7 Pages).

International Search Report and the Written Opinion Dated May 27, 2020 From the International Searching Authority Re. Application No. PCT/IL2020/050204 (8 Pages).

Notification of Office Action and Search report Dated Oct. 31, 2023 From the State Intellectual Property Office of the People's Republic of China Re. Application No. 202080013716.9 (8 Pages).

Office Action Dated Jan. 29, 2024 From the Israel Patent Office Re. Application No. 285692. (4 Pages).

Official Action Dated Jul. 5, 2024 From the US Patent and Trademark Office Re. U.S. Appl. No. 17/428,071. (32 Pages).

Official Action Dated Feb. 24, 2025 From the US Patent and Trademark Office Re. U.S. Appl. No. 17/428,071. (25 Pages).

Restriction Official Action Dated Jan. 12, 2024 From the US Patent and Trademark Office Re. U.S. Appl. No. 17/428,071. (8 Pages).

Supplementary European Search Report and the European Search Opinion Dated Nov. 7, 2022 From the European Patent Office Re. Application No. 20759873.1. (12 Pages).

Supplementary European Search Report and the European Search Opinion Dated Nov. 21, 2022 From the European Patent Office Re. Application No. 20759872.3. (17 Pages).

Molecular Recipes "The Perfect Ice Cream Base", Molecular Recipes, The Wayback Machine, pp. 1-6, XP055833133, Aug. 20, 2020.

Office Action Dated Feb. 18, 2026 From the Israel Patent Office Re. Application No. 285692. (5 Pages).

* cited by examiner

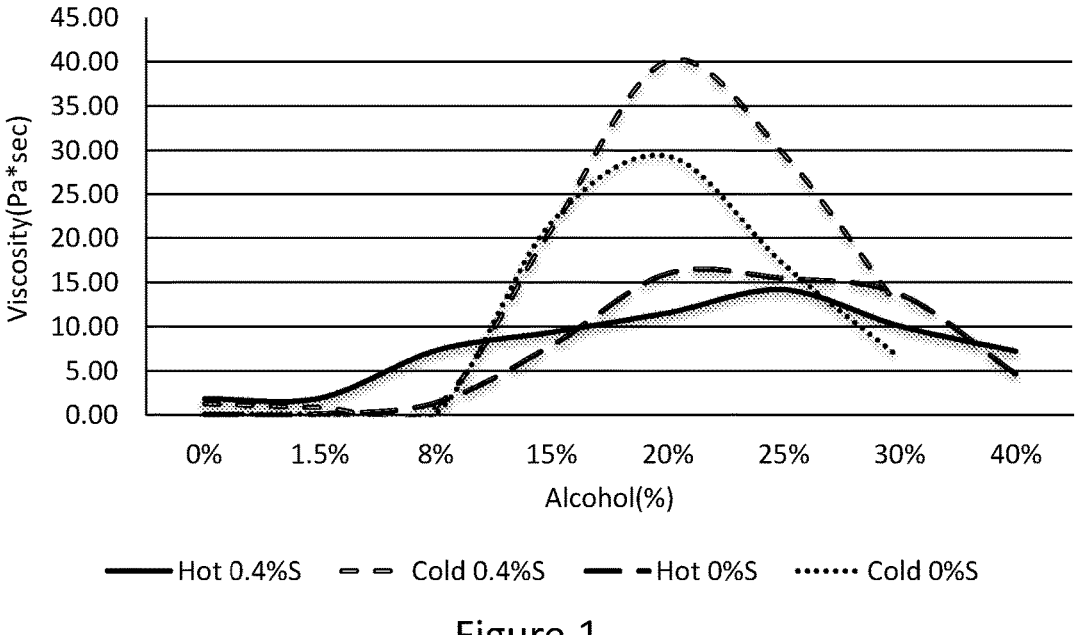
Figure 1
Figure 2A            Figure 2B            Figure 2C Protein sedimentation

STABILIZED SEMISOLID FOOD PRODUCTS

FIELD OF THE INVENTION

The invention relates to compositions and methods for stabilizing and enhancing the viscosity of semisolid compositions, and to the production of stabilized alcohol-containing semisolid food products.

BACKGROUND OF THE INVENTION

Shelf life and food stability are major consideration in the food industry. Over the past years, freezing technology has been a prominent method for fresh goods to increase shelf life. However, many prepared food products are susceptible to degradation when subjected to freeze-thaw conditions. This is particularly true in regard to products which contain emulsions, such as dairy products, frozen desserts, dressings, and various semisolid food products. Upon freeze-thaw these products lose their consistency, flavor, and mouth feel. Other factors that may impair the stability of food products are shear stress, occurring during manufacturing processes and/or due to agitation of the final product during shipment and storage. Impaired stability of such food products may be manifested by phase separation, sedimentation or granule-formation, in which one or more fractions or components are separated from the product to form a non-homogenous composition.

To this end, food stabilizers are commonly used in the food industry. These additives are typically polysaccharide gums possessing gel-forming and hydrocolloid properties, or polypeptide gelling agents such as gelatin. They are commonly used for preventing phase separation in salad dressings, for preventing the formation of ice crystals in frozen food such as ice cream, and for preventing separation of solid food components such as fruit from e.g. jam, yogurt or jellies. Examples include e.g. alginate, agar, carrageen, gelatin, pectin, guar gum, locust bean gum, and xanthan gum.

The preparation of alcohol-containing products that are non-liquid at serving enhances the challenges associated with commercial production, as well as imposes additional specific challenges.

For example, when ethanol is used in compositions of ice-cream-type products prepared using traditional methods, the resulting products do not retain a homogeneous and stable texture and structure after the freezing process is completed. The separation of the ethanol destroys the homogeneity of the texture and of the structure of the frozen products and creates an undesirable second phase at the bottom of the container, consisting mainly of ethanol. This phenomenon occurs due to the freezing point of ethyl alcohol being lower than the freezing point of the other ingredients of ice-creams-type products. The freezing point of ethanol is −114.1° C., a temperature which, besides not being achievable in practical manufacturing methods, would render the resulting ice cream type products inedible. Freezing of liquid compositions comprising ethanol under conditions traditionally used in the manufacture of ice-cream type products, further results in the production of undesirable as ice crystal agglomerations or ice crystal striations. Also, with some desirable ingredients, the ratios cannot be adjusted so as to obtain the required uniform consistency of the ice-cream type product while maintaining the desired flavor and other properties of the frozen comestible.

Because of these problems, alcoholic beverages and ethanol have been very sparsely used as a flavoring component in concentrations higher than 0.5% in ice cream type products, despite the fact that alcoholic beverage flavors are very suitable for flavoring such products. Attempts to produce ice-cream type products comprising higher amounts of ethanol generally involved the use of specialized additives such as stabilizers and/or emulsifiers, or high amounts of conventional additives. Such approaches would potentially impair the desirable taste, texture and other characteristics of ice-cream type products that may be achieved by traditional methods and recipes. In particular, production of frozen desserts in gel form, and/or the use of various gums or other gelling agents, were most commonly suggested for these products. Examples of such products and methods include e.g. U.S. Pat. No. 5,019,414, US 2001/041208 and WO 2017/006221.

Other challenges that may be associated with incorporation of high amounts of ethanol include e.g. considerable and generally undesirable alterations in the melting properties, texture and stability of many food products. In addition, ethanol was reported to elicit or enhance protein denaturation, destabilization and/or sedimentation under certain conditions. Nikolaidis et al (2017, Food Chemistry 232, p. 425-433) examine the effects of heat, pH, ultrasonication and ethanol on the denaturation of whey protein isolate using a difference-UV spectra analysis method. Vilela et al (Beverages 2018, 4, 25) disclose that incorporation of alcohol in cream liqueurs is difficult as the alcohol renders the aqueous phase of these beverages a poorer solvent for proteins, and that as the alcohol content of the cream liqueur increases, the emulsion becomes increasingly sensitive to the interaction between compositional parameters and processing conditions.

Accordingly, incorporation of alcohol in solid or semi-solid food products may be challenging even if these products are not intended to be kept at a frozen state during storage or shipment. Such products are currently available in the form of gels of various consistencies. For example, edible gummy-type candy comprising various liquors, and containing pectin as a gelling agent, are commercially available.

Gels are defined as substantially dilute cross-linked compositions, which exhibit no flow when in the steady-state. By weight, gels are mostly liquid, yet they behave like solids due to a three-dimensional cross-linked network within the liquid.

One drawback of using gelling agents to solidify or stabilize food products is that they are incompatible for use in spreadable or flowable compositions. Such compositions include, for example, semisolid compositions, such as various condiments, pastes and spreads, which possess qualities of both a liquid and a solid.

It is difficult if not impossible to reuse gels once they have formed, as they retain the original structure and rigidity and cannot be used as spreads in the food industry. Trying to spread a gel results in physical breakdown of its texture due to the actual spreading action when it reaches the breaking point of the gel; only by reheating can it return to its original state, which makes reusing gels in food production problematic. The gel once formed cannot be used over a long period as in a continuous production process, but may be more suited to batch production processes.

There remains a need for additional means for enhancing shelf life and stability of food products. In particular, providing food additives capable of enhancing the resistance of food products to shear stress and freeze-thaw conditions and of increasing their viscosity, which are based on natural ingredients amenable for use in the food industry, would be advantageous. There further remains an unmet need for providing alcohol-containing flowable or spreadable food products that are stable in semisolid form at room temperature.

SUMMARY OF THE INVENTION

The invention relates to compositions and methods for stabilizing and enhancing the viscosity of semisolid compositions, in particular to the use of ethanol-containing stabilizers for semisolid food products. More specifically, embodiments of the invention relate to novel stabilizers for semisolid compositions, to alcohol-containing semisolid food compositions comprising them, and to processes for the preparation and use thereof.

The invention is based, in part, on the surprising discovery, that ethanol may be potentiated in the presence of protein in aqueous media, to form a composition having stabilizing properties. In particular, it is herein disclosed for the first time, that reconstitution of dry protein powders in aqueous ethanol-containing fluids, performed under specific conditions and at predetermined amounts, produces a stabilizer composition, capable of enhancing the stability, homogeneity and texture of semisolid compositions. Unexpectedly, increasing the overall amount of alcohol in the composition, while retaining sufficient amounts of the protein, resulted in increased viscosity. This is particularly surprising as alcohol is a liquid, known to dilute and reduce the viscosity of substances when used alone. Further, as disclosed herein, it is now possible to produce alcohol-containing semisolid food products that maintain a stable semisolid consistency over a wide range of temperatures commonly used during storage and serving, for a periods of hours, days or weeks, without notable texture changes (such as phase separation). These properties are maintained in the absence of any gel forming agents or other commonly used stabilizers, and even after being subjected to shear stress, agitation and multiple cycles of freezing and thawing.

Thus, it is herein disclosed for the first time that ethanol may be used for enhancing the resistance of food products to shear stress, enhancing the freeze-thaw stability of food products, and/or increasing their viscosity, when used in conjunction with suitable protein compositions. These findings were established for a variety of dietary proteins, including whey, soy, pea, and rice, and for a commercially available mixture of pea, brown rice, quinoa, chia seed, and amaranth proteins. These proteins are characterized by a cysteine content in the general range of 0.7-3.5% and more typically 1-3.5% w/w, which appeared to correlate with their viscosity-enhancing properties. Further, the content of branched amino acids leucine, isoleucine and valine (BCAA) in these protein powders is in the range of 10-30% w/w in total.

Accordingly, in some embodiments, provided are alcohol-containing semisolid food compositions comprising a stabilizer, the stabilizer consisting essentially of ethanol, protein and water. In various embodiments, the alcohol-containing semisolid food composition retain a stable semisolid consistency at room temperature (20-25° C.), at refrigeration temperature (4-8° C.) and/or at home freezer temperatures (−10° C. to −25° C.) for a period of several hours, days, weeks or months, wherein each possibility represents a separate embodiment of the invention. Typically, the compositions remain stable for at least 1-7 days at 20° C. and 1-7 weeks at 4° C. in the absence of added gelling agents or other stabilizers. In other embodiments, the alcohol-containing semisolid food compositions are characterized by a Brookfield viscosity of 2-60 Pa·s, measured at 20° C. at a constant shear rate of 100 l/s after 3 seconds, in the absence of gel forming agents or other stabilizers. In various embodiments, the stabilizer is advantageously produced and further characterized as detailed below.

In one aspect, there is provided an alcohol-containing semisolid food composition comprising a stabilizer, the stabilizer consisting essentially of ethanol, protein and water, wherein the composition is substantially devoid of gelling agents, comprises 3-40% w/w ethanol, 4-25% w/w protein, and 25-65% w/w water in total, and maintains a stable semisolid consistency at 20° C. for at least 24 hours, at least 48 hours or at least 72 hours. In other embodiments, said composition maintains a stable semisolid consistency at 20° C. for 4, 5, 6 or 7 days. In other embodiments, said composition maintains a stable semisolid consistency at 20° C. for 1-7 days. In other embodiments, the composition maintains a stable semisolid consistency at 4° C. for at least 1-4 weeks.

In another embodiment, said composition is characterized by viscosity of 2-60 Pa·s, measured at 20° C. at a constant shear rate of 100 l/s after 3 seconds, in the absence of gel forming agents. In another embodiment, the composition is characterized by final concentrations, following addition of said stabilizer, of 3-40% w/w ethanol, 4-25% w/w protein, 25-65% w/w water, 6-10% w/w fat, and 17-27% w/w carbohydrates. In another embodiment, the composition has a continuous flowable or spreadable matrix. According to various embodiments, the composition may be a flowable and/or spreadable food product, e.g. a condiment, sauce, confectionary, filling, pudding, cheese, spread, dessert, yogurt and pate. In yet another embodiment, the composition exhibits non-Newtonian properties, in particular pseudoplastic properties (rheology), in the absence of added gel forming agents.

In another embodiment, the protein component of said stabilizer is characterized by a cysteine content of 0.7-3.5% w/w, e.g. 1-3.5% w/w or 1-3% w/w. In another embodiment the protein component of said stabilizer is characterized by a BCAA content of 10-30% w/w in total. In various embodiments, said protein is a food-grade protein, e.g. whey proteins, soy proteins, pea proteins, rice proteins, quinoa proteins, chia seed proteins, amaranth proteins, and combinations thereof. In particular embodiments, said protein is obtained from whey, soy, pea and/or rice concentrates or isolates, wherein each possibility represents a separate embodiment of the invention. In other particular embodiment, said proteins are incorporated into the stabilizer in solid form, e.g. in dry powder form. In various other embodiments, the use of advantageous stabilizers, including those produced according to specific methods as disclosed hereinbelow (also referred to herein as the stabilizers of the invention), is contemplated.

For example, whey proteins (e.g. whey protein concentrate in dry powder form as exemplified herein) are typically characterized by a cysteine content of 2-2.7% w/w, and a BCAA content of 20-25% w/w; soy proteins are typically characterized by a cysteine content of 2.5-3.5% w/w, and a BCAA content of 15-20% w/w; pea proteins are typically characterized by a cysteine content of 1-1.5% w/w, and a BCAA content of 15-20% w/w, and rice proteins are typically characterized by a cysteine content of 1.4-2% w/w, and a BCAA content of 15-20% w/w. Further, a commercially available mixture of pea, rice, quinoa and chia proteins as further exemplified hereinbelow, was characterized by a cysteine content of 2.2-3% w/w, and a BCAA content of 15-20% w/w.

In a particular embodiment, the composition contains 3-10% w/w of a protein characterized by a cysteine content of 2.7-3.5% w/w. In another particular embodiment, said composition contains 10-18% w/w of a protein characterized by a cysteine content of 1.4-2.6% w/w. in yet another particular embodiment, said composition contains 16-20% w/w of a protein characterized by a cysteine content of 0.7-1.3% w/w.

In various other embodiments, said composition comprises 3-20% w/w ethanol, 25-65% w/w water, 6-10% w/w fat, 17-27% w/w carbohydrates, and the protein component of said stabilizer is selected from the group consisting of: (i) whey proteins, at a final concentration of 10-15% w/w (of said food composition), (ii) soy proteins, at a final concentration of 3-10% w/w, (iii) pea proteins, at a final concentration of 15-20% w/w, and rice proteins, at a final concentration of 13-20% w/w. Each possibility represents a separate embodiment of the invention. In another embodiment, said food product contains less than 0.2% w/w in total of other stabilizers and emulsifiers. In another embodiment, said food product is substantially devoid of other stabilizers.

In another aspect, there is provided an alcohol-containing semisolid composition comprising a stabilizer, the stabilizer consisting essentially of ethanol, protein and water, wherein the protein is characterized by a cysteine content of 0.7-3.5% w/w and a BCAA content of 10-30% w/w in total, and wherein the composition is characterized by final concentrations, following addition of said stabilizer, of 3-40% w/w ethanol, 4-25% w/w of the protein, 25-65% w/w water, 6-10% w/w fat, and 17-27% w/w carbohydrates, by a flowable or spreadable semisolid consistency, and by viscosity of 2-60 Pa·s, measured at 20° C. at a constant shear rate of 100 l/s after 3 seconds, in the absence of gel forming agents.

In another embodiment, the composition comprises:
3-10% w/w of a protein characterized by a cysteine content of 2.7-3.5% w/w;
10-18% w/w of a protein characterized by a cysteine content of 1.4-2.6% w/w; or
16-20% w/w of a protein characterized by a cysteine content of 0.7-1.3% w/w.

In some embodiments, the composition is a flowable and/or spreadable food product. In other embodiments, the composition retains a stable semisolid consistency at 20° C. for at least 24 hours, at least 48 hours, or at least 72 hours. In another embodiment, the composition retains a stable semi-solid consistency at 20° C. for at least four days or at least five days. In another embodiment, the composition retains a stable semisolid consistency at 20° C. for 1-7 days. In other embodiments, the composition maintains a stable semisolid consistency at 4° C. for at least 1-4 weeks. In some embodiments, said composition which is substantially devoid of polysaccharide gel-forming agents and of poly-peptide gel-forming agents. In another embodiment, the composition exhibits non-Newtonian pseudoplastic properties in the absence of added gel forming agents.

In another embodiment, the protein is a food-grade protein e.g. selected from the group consisting of whey proteins, soy proteins, pea proteins, rice proteins, quinoa proteins, chia seed proteins, amaranth proteins, and combinations thereof. In a particular embodiment, said composition comprises 3-20% w/w ethanol, 25-65% w/w water, 6-10% w/w fat, 17-27% w/w carbohydrates, and 10-15% w/w whey proteins. In another particular embodiment, said composition comprises 3-20% w/w ethanol, 25-65% w/w water, 6-10% w/w fat, 17-27% w/w carbohydrates, and 3-10% w/w soy proteins. In yet another particular embodiment, said composition comprises 3-20% w/w ethanol, 25-65% w/w water, 6-10% w/w fat, 17-27% w/w carbohydrates, and 15-20% pea proteins. In a further particular embodiment, said composition comprises 3-20% w/w ethanol, 25-65% w/w water, 6-10% w/w fat, 17-27% w/w carbohydrates, and 13-20% w/w rice proteins. In various other embodiments, the stabilizer is a stabilizer of the invention as disclosed herein. In another embodiment the food composition is selected from the group consisting of a condiment, sauce, confectionary, filling, pudding, cheese, spread, dessert, yogurt, and pate.

In another aspect, the invention relates to a method of preparing a semisolid composition (e.g. food product) as disclosed herein, comprising:
a. providing a composition having a flowable or spreadable continuous matrix,
b. providing a stabilizer, prepared by combining 25-65% w/w water, 15-45% w/w ethanol and 5-27% w/w protein, under conditions sufficient to enhance the viscosity of the combined composition by 150-5,0000 fold in the absence of gel forming agents, wherein the resulting stabilizer is characterized by viscosity of 2-60 Pa·s measured at 20° C. at a constant shear rate of 100 l/s after 3 seconds and is substantially devoid of poly-saccharide gel forming agents and polypeptide gel forming agents, and
c. admixing the composition with the stabilizer to obtain a substantially uniform composition characterized by a final concentration of 3-40% w/w ethanol and 4-25% w/w protein.

In one embodiment, step b) comprises:
(b1) providing a protein composition in solid form, characterized by up to 15% loss on drying (LOD), and containing at least 60% and typically 60-95% w/w of the protein, and
(b2) reconstituting the protein composition in an aqueous ethanol-containing fluid, to final concentrations of 25-65% w/w water, 15-45% w/w ethanol and 5-27% w/w protein.

In a particular embodiment, said protein composition is characterized by up to 6% LOD. In another particular embodiment, said protein composition contains 70-85% of said protein. In another embodiment said protein composition is characterized by a cysteine content of 0.7-3.5%, e.g. 1-3.5% w/w and a total BCAA content of 10-30% e.g. 15-25% w/w (of the protein component of said composition).

In another embodiment, step b. is performed at a temperature of 35-79° C. In a particular embodiment, step b. is performed at a temperature of 40-65° C. In another particular embodiment wherein the temperature is 40-65° C., the resulting composition comprises 10-15% whey proteins, 3-20% ethanol, 14-20% carbohydrates, 6-10% fat, 22-55% water, and is characterized by viscosity of 2-16 Pa·s measured at 20° C. at a constant shear rate of 100 l/s after 3 seconds. In another particular embodiment wherein the temperature is 40-65° C., the resulting composition comprises 10-15% whey protein, 21-40% ethanol, 5-9% carbohydrates, 6-10% fat, and 20-40% water, and is characterized by viscosity of 5-12 Pa·s measured at 20° C. at a constant shear rate of 100 l/s after 3 seconds. In another particular embodiment wherein the temperature is 40-65° C., the resulting composition comprises 3-10% w/w soy protein, 3-20% w/w ethanol, 14-20% w/w carbohydrates, 6-10% w/w fat, and 40-65% w/w water, and is characterized by viscosity of 3-13 Pa·s measured at 20° C. at a constant shear rate of 100 l/s after 3 seconds. In another particular embodiment wherein the temperature is 40-65° C., the resulting composition comprises 15-20% w/w pea protein, 3-20% w/w ethanol, 15-20% w/w carbohydrates, 6-10% w/w fat, and 35-60% w/w water, and is characterized by viscosity of 2-20 Pa·s measured at 20° C. at a constant shear rate of 100 l/s after 3 seconds. In another particular embodiment wherein the temperature is 40-65° C., the resulting composition comprises 13-20% w/w rice protein, 3-20% w/w ethanol, 14-20% w/w carbohydrates, 6-10% w/w fat, and 35-60% w/w water, and is characterized by viscosity of 2-20 Pa·s measured at 20° C. at a constant shear rate of 100 l/s after 3 seconds. In another embodiment, steps b. and/or c. are conducted under conditions insufficient for pasteurization.

In another embodiment, the method is used in a continuous industrial production process. In another embodiment the method is used in a batch industrial production process.

In another embodiment, the composition provided in step a. is a food product. In another embodiment, the composition of step a. is selected from the group consisting of a condiment, sauce, confectionary, filling, pudding, cheese, spread, dessert, yogurt and pate.

In another aspect, the invention relates to a stabilizer for semisolid compositions, comprising 15-45% ethanol, 5-27% protein and 25-65% water, to a total of at least 85% and typically at least 90% w/w of the stabilizer, said stabilizer characterized by viscosity of 2-60 Pa·s, measured at 20° C. at a constant shear rate of 100 l/s after 3 seconds, and is substantially devoid of polysaccharide gelling agents and polypeptide gelling agents. In one embodiment, the stabilizer is capable of enhancing the resistance of a semisolid food product to phase separation resulting from shear stress or agitation. In another embodiment the stabilizer is capable of enhancing the freeze-thaw stability of a semisolid food product. In another embodiment, the stabilizer is capable of enhancing the viscosity of a semisolid food product. According to exemplary embodiments, the food product is a flowable or spreadable food product as disclosed herein.

In another embodiment, the stabilizer is characterized by a flowable or spreadable semisolid consistency. In another embodiment, the stabilizer is capable of endowing a liquid composition with a flowable or spreadable semisolid consistency. In another embodiment, the stabilizer exhibits non-Newtonian pseudoplastic properties in the absence of added gel forming agents.

It is to be understood, that the protein, ethanol and water components of the stabilizer collectively amount to at least 85% and typically at least 90% w/w of said stabilizer. Thus, the collective amounts of other components, such as carbohydrates, fats, flavoring agents and the like, typically does not exceed 10% w/w of said stabilizer. In various embodiments, the amounts of the additional components are 0.5-5%, 0-1%, 5-10%, or 3-7%. For example, the collective amount of carbohydrates and fats may be 0-10%, 0-7%, 5-10% or 5-8%. In another embodiment, the stabilizer consists essentially of ethanol, protein, water, and optionally one or more flavoring agents or preservatives. In a particular embodiment, said stabilizer contains 0.5-1% w/w flavoring agents. In another particular embodiment, said stabilizer contains 0.1-0.5% w/w flavoring agents. In other embodiments, other additives or excipients may be included at limited amounts (typically up to 1%, 0.5% or 0.2% w/w), for example, coloring agents, preservatives, sweeteners, antioxidants and acidity regulators. It is to be understood, however, that the additives and the amounts at which they are incorporated in the stabilizer compositions of the invention are advantageously selected such that they do not substantially alter the viscosity of the stabilizer, or its rheological properties as disclosed herein. In another embodiment, the stabilizer is devoid of gel forming agents. In another embodiment, the stabilizer is substantially devoid of gel forming agents or other thickening agents. In another embodiment, the stabilizer is substantially devoid of other stabilizers and/or emulsifiers.

In another embodiment, the protein is characterized by a cysteine content of 0.7-3.5% w/w. In another embodiment, the protein is characterized by a cysteine content of 1-3.5% w/w. In another embodiment, the protein is characterized by a cysteine content of 1-3% w/w. In other embodiments, the protein is characterized by a cysteine content of 2-2.7%, 2.5-3.5%, 1-1.5, 1.4-2%, or 2.2-3% w/w, wherein each possibility represents a separate embodiment of the invention.

In another embodiment the protein is the protein is characterized by a BCAA content of 10-30% w/w in total. In In another embodiment, said protein is characterized by a BCAA content of 20-25% w/w. In another embodiment, said protein is characterized by a BCAA content of 15-20% w/w.

In another embodiment the protein is a food-grade protein. In another embodiment said protein is a food-grade protein selected from the group consisting of whey proteins, soy proteins, pea proteins, rice proteins, quinoa proteins, chia seed proteins, amaranth proteins, and combinations thereof. In another embodiment, said stabilizer consists essentially of i) 25-65% w/w water, ii) 15-45% w/w ethanol, iii) 13-25% whey proteins or 8-15% w/w soy proteins or 15-27% w/w pea proteins or 13-25% rice proteins, and (iv) 0-1% flavoring agents.

According to one exemplary embodiment, the stabilizer comprises 20-45% w/w ethanol, 25-50% w/w water, 13-25% whey proteins, and up to 10% w/w in total of carbohydrates, fats and flavoring agents. In another exemplary embodiment, the stabilizer comprises 15-45% w/w ethanol, 30-60% w/w water, 8-15% w/w soy proteins, and up to 10% w/w in total of carbohydrates, fats and flavoring agents. In another exemplary embodiment, the stabilizer comprises 20-45% w/w ethanol, 25-50% w/w water, 15-27% w/w pea proteins, and up to 10% w/w in total of carbohydrates, fats and flavoring agents. In another exemplary embodiment, the stabilizer comprises 20-45% w/w ethanol, 25-50% w/w water, 13-25% rice proteins, and up to 10% w/w in total of carbohydrates, fats and flavoring agents.

In another embodiment, said stabilizer consists essentially of i) 25-65% w/w water, ii) 15-45% w/w ethanol, iii) 3-10% w/w of a protein characterized by a cysteine content of 2.7-3.5% w/w, or 10-18% w/w of a protein characterized by a cysteine content of 1.4-2.6% w/w, or 16-20% w/w of a protein characterized by a cysteine content of 0.7-1.3% w/w, and (iv) 0-10% in total of carbohydrates, fats and flavoring agents.

In another aspect, the invention relates to a method of preparing a stabilizer, e.g. a stabilizer for semisolid compositions as disclosed herein, comprising:
  a. providing a protein composition in solid form, characterized by up to 15% LOD, and containing at least 60% and typically 60-95% w/w of the protein,
  b. reconstituting the protein composition in an aqueous ethanol-containing fluid, to final concentrations of 25-65% w/w water, 15-45% w/w ethanol and 5-27% w/w protein.

In another embodiment, said protein composition is characterized by up to 10%, 8%, 6%, 5%, 4% or 3% LOD. In another embodiment, said protein composition contains at least 60%, 65%, 70%, 75%, 80%, 85%, 90% or 95% of said protein. In another embodiment, said protein composition contains 60-95% of said protein. In another embodiment, said protein composition contains 70-85% of said protein. In another embodiment, said protein composition contains 80-90% of said protein. Each possibility represents a separate embodiment of the invention.

In another embodiment, the reconstitution is performed under conditions sufficient to enhance the viscosity of the resulting composition by 150-5,000 fold compared to the aqueous fluid in the absence of gel forming agents or other thickening agents. In another embodiment, the conditions are additionally insufficient to elicit irreversible denaturation of said protein. In another embodiment, the conditions are additionally insufficient for pasteurization. For example, reconstitution is generally performed at a temperature within the range of 4-80° C., wherein preferred ranges for some embodiments are of 35-79° C., more typically 40-65° C.

In another embodiment, the method is used in a continuous production process. In another embodiment the method is used in a batch production process.

According to one exemplary embodiment wherein the temperature is 40-65° C., the stabilizer comprises 20-45% w/w ethanol, 25-50% w/w water, 13-25% whey proteins, and up to 10% w/w in total of carbohydrates, fats and flavoring agents.

In another exemplary embodiment wherein the temperature is 40-65° C., the stabilizer comprises 15-45% w/w ethanol, 30-60% w/w water, 8-15% w/w soy proteins, and up to 10% w/w in total of carbohydrates, fats and flavoring agents.

In another exemplary embodiment wherein the temperature is 40-65° C., the stabilizer comprises 20-45% w/w ethanol, 25-50% w/w water, 15-27% w/w pea proteins, and up to 10% w/w in total of carbohydrates, fats and flavoring agents.

In another exemplary embodiment wherein the temperature is 40-65° C., the stabilizer comprises 20-45% w/w ethanol, 25-50% w/w water, 13-25% rice proteins, and up to 10% w/w in total of carbohydrates, fats and flavoring agents.

In another aspect, there is provided a method of stabilizing a food product, comprising:

a. providing a food product having a continuous flowable or spreadable matrix, or a pre-mix thereof (mixture of ingredients used for producing the product), b. admixing ethanol and optionally a food-grade protein with the product or pre-mix, in amounts and under conditions so as to enhance the viscosity of said product or pre-mix by at least 0.5 Pa·s and to at least 2 Pa·s measured at 20° C. at a constant shear rate of 100 1/s after 3 seconds, to thereby enhance the resistance of said product to shear stress and/or enhance the freeze-thaw stability of said product.

In one embodiment, the resulting composition is characterized by a final concentration of 3-40% w/w ethanol and 4-25% w/w protein. In another embodiment, the resulting composition comprises 3-40% w/w ethanol, 4-25% w/w protein, 25-65% w/w water, 6-10% w/w fat, and 17-27% w/w carbohydrates. In another embodiment the protein is characterized by a cysteine content of 0.7-3.5% e.g. 1-3.5% w/w and/or a total BCAA content of 10-30% e.g. 15-25% w/w. In some embodiments the protein is selected from the group consisting of whey proteins, soy proteins, pea proteins, rice proteins, quinoa proteins, chia proteins, and combinations thereof. In another embodiment, the admixing is performed at a temperature of 35-79° C., typically 40-65° C.

In another embodiment the protein is selected from the group consisting of whey proteins, soy proteins, pea proteins, rice proteins, quinoa proteins, chia seed proteins, amaranth proteins, and combinations thereof. In another embodiment the protein is provided in solid form, characterized by up to 15% LOD, and containing at least 60% w/w of said protein. In another embodiment, the method is used in a continuous industrial production process.

In another aspect, there is provided a method of enhancing the viscosity of a composition, comprising:

a. providing a first composition having a continuous matrix in the form of a liquid or a semisolid, or a pre-mix thereof, b. admixing the first composition or pre-mix with 3-40% w/w ethanol and optionally up to 25% w/w of a protein characterized a cysteine content of 0.7-3.5% w/w, at a temperature of 40-65° C., to obtain a substantially uniform second composition, wherein the second composition is characterized by final concentrations of 3-40% w/w ethanol, 4-25% w/w protein, 25-65% w/w water, 6-10% w/w fat, and 17-27% w/w carbohydrates, by non-Newtonian pseudoplastic rheology, and by enhanced viscosity compared to said first composition.

In some embodiments the protein is selected from the group consisting of whey proteins, soy proteins, pea proteins, rice proteins, quinoa proteins, chia proteins, and combinations thereof.

In another embodiment wherein the temperature is 40-65° C., the resulting composition comprises 10-15% whey proteins, 3-20% ethanol, 14-20% carbohydrates, 6-10% fat, 22-55% water, and is characterized by viscosity of 2-16 Pa·s. In another embodiment wherein the temperature is 40-65° C., the resulting composition comprises 10-15% whey protein, 21-40% ethanol, 5-9% carbohydrates, 6-10% fat, and 20-40% water, and is characterized by viscosity of 5-12 Pa·s. In another embodiment wherein the temperature is 40-65° C., the resulting composition comprises 3-10% w/w soy protein, 3-20% w/w ethanol, 14-20% w/w carbohydrates, 6-10% w/w fat, and 40-65% w/w water, and is characterized by viscosity of 3-13 Pa·s. In another particular embodiment wherein the temperature is 40-65° C., the resulting composition comprises 15-20% w/w pea protein, 3-20% w/w ethanol, 15-20% w/w carbohydrates, 6-10% w/w fat, and 35-60% w/w water, and is characterized by viscosity of 2-20 Pa·s. In another particular embodiment wherein the temperature is 40-65° C., the resulting composition comprises 13-20% w/w rice protein, 3-20% w/w ethanol, 14-20% w/w carbohydrates, 6-10% w/w fat, and 35-60% w/w water, and is characterized by viscosity of 2-20 Pa·s.

In another embodiment the protein is provided in solid form, characterized by up to 15% LOD, and containing at least 60% w/w of said protein. In another embodiment, the method is used in a continuous industrial production process.

Other objects, features and advantages of the present invention will become clear from the following description and drawings.

BRIEF DESCRIPTION OF THE DRAWINGS

FIG. 1. presents the viscosity of food products comprising 15% whey protein and varying alcohol content, produced under various conditions with or without stabilizers.

FIGS. 2A-2C. depict food products comprising varying alcohol, protein and stabilizers content, after being subjected to freeze-thaw conditions and shear stress: FIG. 2A—8% alcohol, no added protein powder and 0.8% stabilizers after 2-7 hours at room temperature, FIG. 2B—8% alcohol, 15% whey protein and 0% stabilizers after one week at room temperature, FIG. 2C—0% alcohol, 15% whey protein and 0% stabilizers after one day at room temperature.

Figure 3:
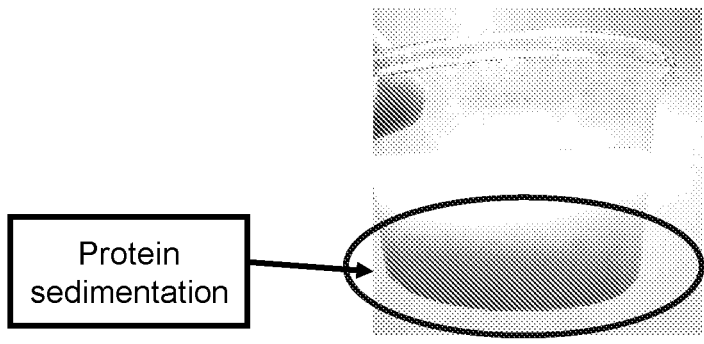

FIG. 3. portrays a low protein (1%) high alcohol (37%) non-stabilizing base composition after 10-30 minutes at room temperature.

Figure 4A:
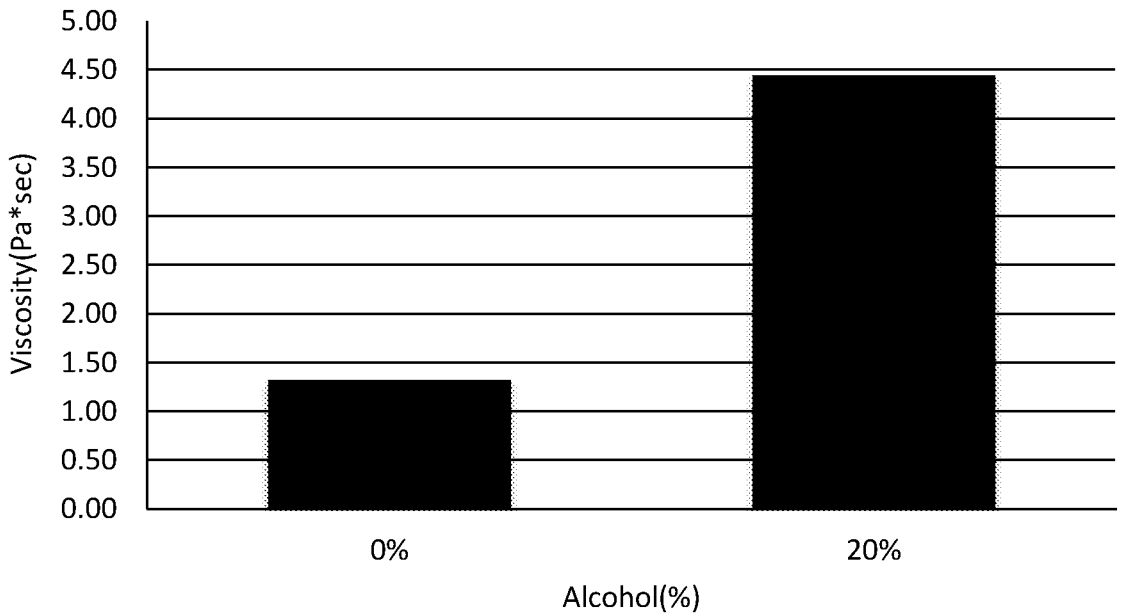
Figure 4B:
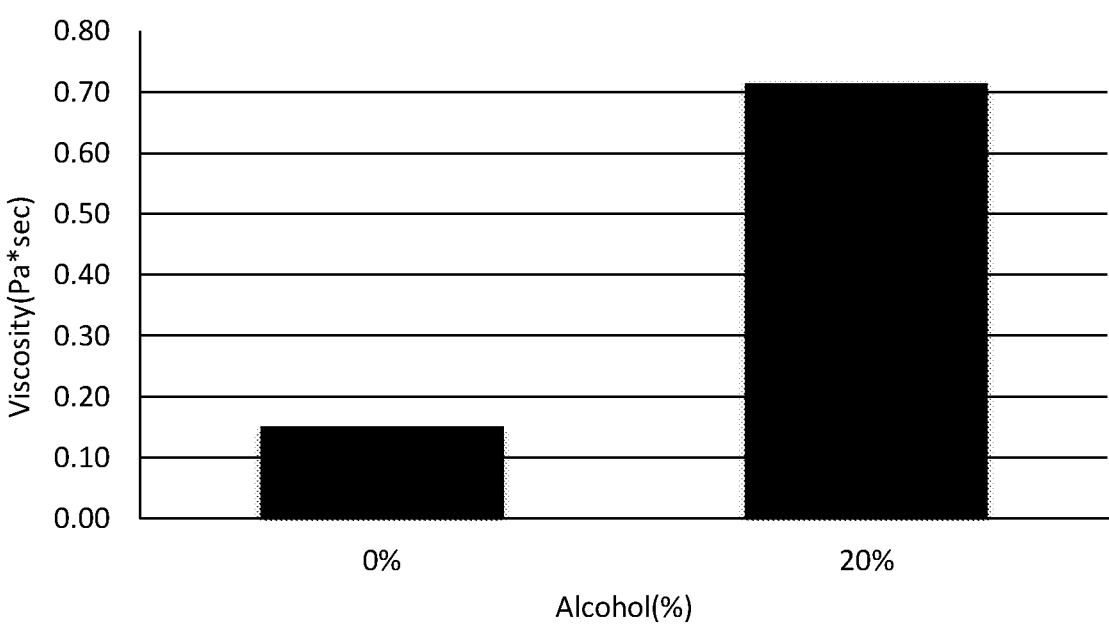

FIG. 4 shows the viscosity of cheese spread (FIG. 4A) and chocolate pudding (FIG. 4B) after the addition of the base composition (protein and water), with or without alcohol.

Figure 5:
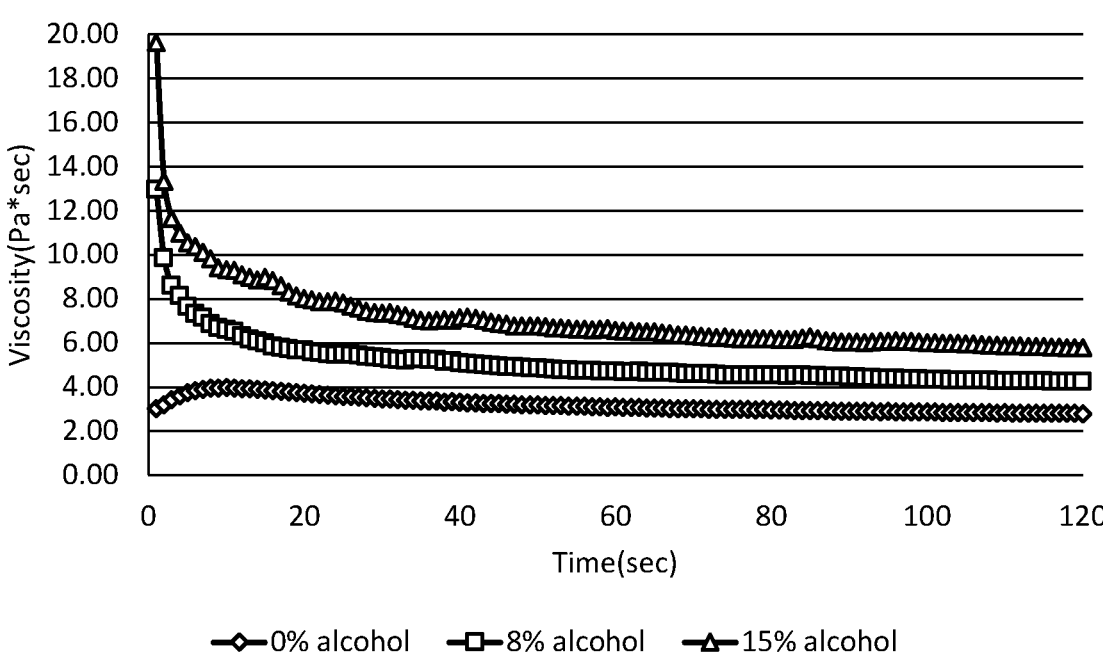

FIG. 5. presents the average viscosity readings (3 replicates) observed along 120 seconds at deformation of 100 l/s shear rate, sampled at one second intervals, of food product comprising 8% soy protein and varying content of alcohol (0%, 8% or 15%).

Figure 6A:
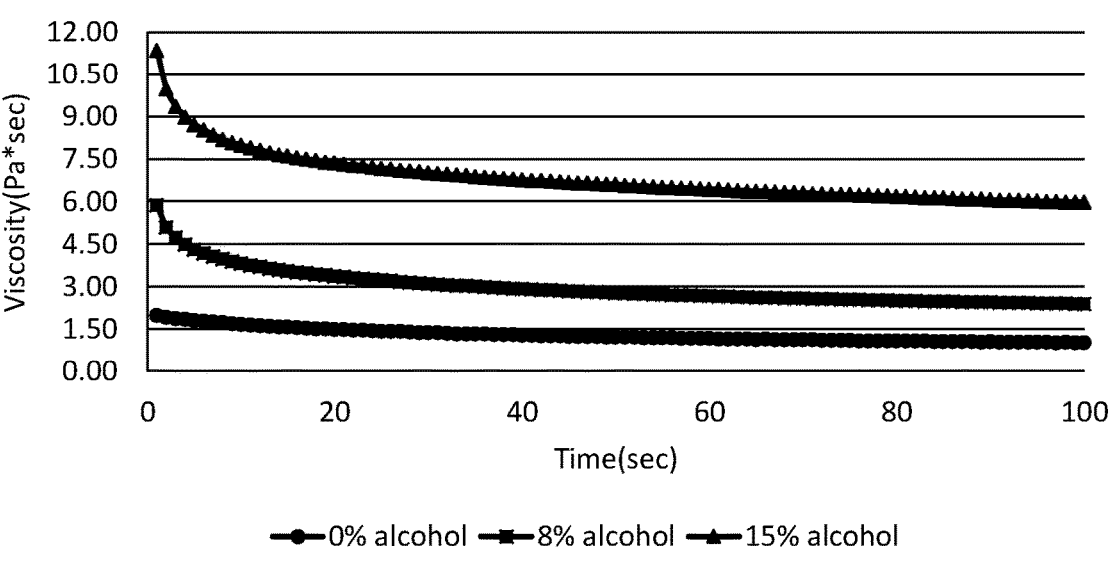
Figure 6B:
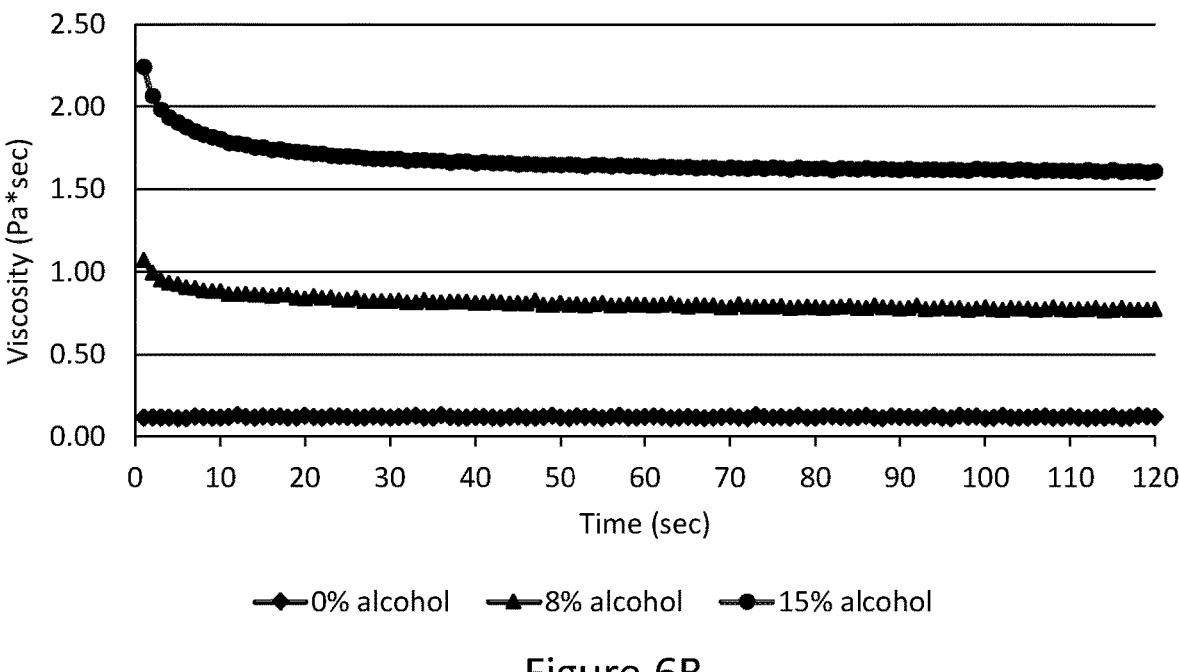

FIGS. 6A-6B. portray the average viscosity readings (3 replicates) observed along 120 seconds at deformation of 100 l/s shear rate, sampled at one second intervals, of food products comprising 15% whey protein and varying content of alcohol (0%, 8% or 15%). FIG. 6A product tested after refrigerator storage. FIG. 6B product tested after freezer storage.

Figure 7A:
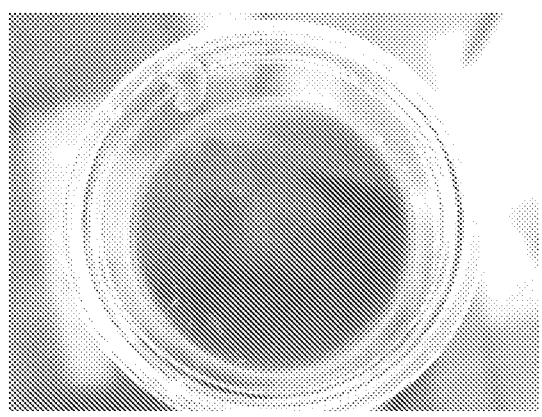
Figure 7B:

FIGS. 7A-7B. depict alcohol containing food products with about 60° C. (FIG. 7A) and about 85° C. (FIG. 7B) average temperature used in the production process.

Figure 8:
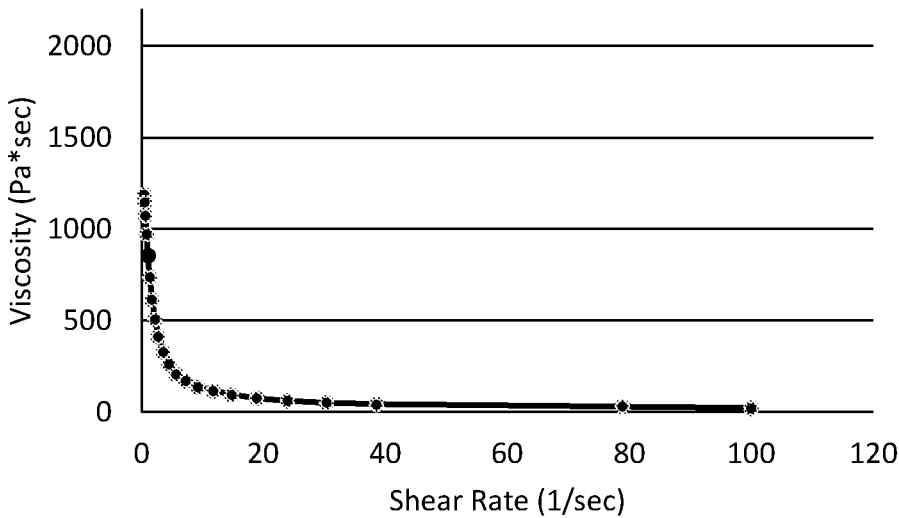

FIG. 8. shows the viscosity under shear rate of 0-100 l/s of a food product comprising 15% protein, 15% alcohol and 0.4% stabilizers.

Figure 9:
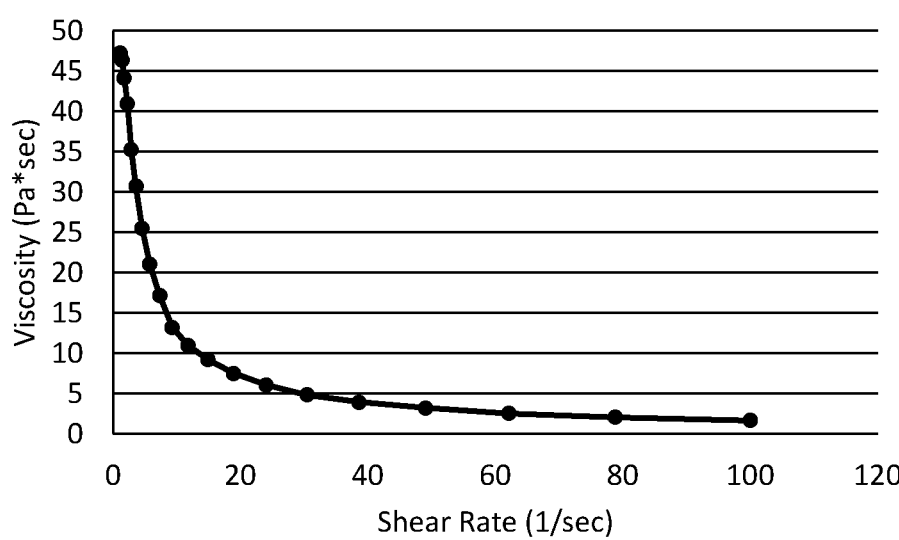

FIG. 9. presents the viscosity under shear rate of 0-100 l/s of a base consisting of 15% protein, 35% alcohol and 45% water.

DETAILED DESCRIPTION OF THE INVENTION

The invention relates to compositions and methods for producing, stabilizing and enhancing the viscosity of semisolid compositions, in particular to the use of ethanol-containing stabilizers for semisolid food products. More specifically, embodiments of the invention relate to novel stabilizers for semisolid compositions, to alcohol-containing semisolid food compositions comprising them, and to processes for the preparation and use thereof.

The invention relates in some aspect and embodiments to novel compositions capable of stabilizing or otherwise improving the properties of semisolid compositions e.g. with respect to texture, shelf-life and/or rheology, also referred to herein as the stabilizers of the invention.

As disclosed herein, the stabilizers may be used according to embodiments of the invention for enhancing the resistance of semisolid food products to phase separation resulting from shear stress or agitation, for enhancing the freeze-thaw stability of semisolid food products, and/or for enhancing the viscosity of semisolid food products. According to other advantageous embodiments, the stabilizer compositions may be used for incorporating alcohol in a semisolid food product in a stabilized form, without impairing the texture, viscosity, or consistency of said food product and without impairing its stability.

According to aspects and embodiments of the invention, the stabilizers consist essentially of ethanol, protein and water, wherein the stabilizing properties of ethanol as surprisingly identified herein are potentiated in the presence of protein when used at specific ratios and conditions. As disclosed herein, neither ethanol nor protein, when used alone, are sufficiently effective for stabilizing semisolid food products, and may even impair their properties (such as texture and consistency). In contradistinction, it is surprisingly disclosed herein that ethanol and various proteins characterized by their amino acid content profile, may act in synergy to stabilize and enhance the viscosity of semisolid compositions.

In one aspect there is provided a stabilizer for semisolid compositions, comprising 15-45% ethanol, 5-27% protein and 25-65% water, to a total of at least 90% w/w of the stabilizer, said stabilizer being characterized by viscosity of 2-60 Pa·s, measured at 20° C. at a constant shear rate of 100 l/s after 3 seconds, and is substantially devoid of polysaccharide gelling agents and polypeptide gelling agents.

In another aspect, there is provided a method of preparing the stabilizer, comprising:

a. providing a protein composition in solid form, characterized by up to 15% loss on drying (LOD), and containing at least 60% w/w of the protein, b. reconstituting the protein composition in an aqueous ethanol-containing fluid, to final concentrations of 25-65% w/w water, 15-45% w/w ethanol and 5-27% w/w protein.

In another aspect, the invention relates to an alcohol-containing semisolid food composition comprising a stabilizer, the stabilizer consisting essentially of ethanol, protein and water, wherein the composition is substantially devoid of gelling agents, comprises 3-40% w/w ethanol, 4-25% w/w protein, and 25-65% w/w water in total, and maintains a stable semisolid consistency at 20° C. for at least 24 hours, at least 48 hours or at least 72 hours.

In another aspect, invention provides an alcohol-containing semisolid composition comprising a stabilizer, the stabilizer consisting essentially of ethanol, protein and water, wherein the protein is characterized by a cysteine content of 0.7-3.5% w/w and a branched chain amino acid (BCAA) content of 10-30% w/w in total, and wherein the composition is characterized by final concentrations, following addition of said stabilizer, of 3-40% w/w ethanol, 4-25% w/w of the protein, 25-65% w/w water, 6-10% w/w fat, and 17-27% w/w carbohydrates, by a flowable or spreadable semisolid consistency, and by viscosity of 2-60 Pa·s, measured at 20° C. at a constant shear rate of 100 l/s after 3 seconds, in the absence of gel forming agents.

In another aspect, the invention relates to a method of preparing the semisolid composition, comprising:

a. providing a composition having a flowable or spreadable continuous matrix, b. providing a stabilizer, prepared by combining 25-65% w/w water, 15-45% w/w ethanol and 5-27% w/w protein, under conditions sufficient to enhance the viscosity of the combined composition by 150-5,000 fold in the absence of gel forming agents, wherein the resulting stabilizer is characterized by a Brookfield viscosity of 2-60 Pa·s measured at 20° C. at a constant shear rate of 100 l/s after 3 seconds, and is substantially devoid of polysaccharide gel forming agents and polypeptide gel forming agents, and c. admixing the composition with the stabilizer to obtain a substantially uniform composition characterized by a final concentration of 3-40% w/w ethanol and 4-25% w/w protein.

In another aspect, the invention relates to a method of stabilizing a food product, comprising:

a. providing a food product having a continuous flowable or spreadable matrix, or a pre-mix thereof, b. admixing ethanol and optionally a food-grade protein with the product or pre-mix, in amounts and under conditions so as to enhance the viscosity of said product or pre-mix by at least 0.5 Pa·s and to at least 2 Pa·s measured at 20° C. at a constant shear rate of 100 l/s after 3 seconds, to thereby enhance the resistance of said product to shear stress and/or enhance the freeze-thaw stability of said product.

In another aspect, there is provided a method of enhancing the viscosity of a composition, comprising:

a. providing a first composition having a continuous matrix in the form of a liquid or a semisolid, or a pre-mix thereof, b. admixing the first composition or pre-mix with 3-40% w/w ethanol and optionally up to 25% w/w of a protein characterized a cysteine content of 0.7-3.5% w/w, at a temperature of 40-65° C., to obtain a substantially uniform second composition, wherein the second composition is characterized by final concentrations of 3-40% w/w ethanol, 4-25% w/w protein, 25-65% w/w water, 6-10% w/w fat, and 17-27% w/w carbohydrates, by non-Newtonian pseudoplastic rheology, and by enhanced viscosity compared to said first composition.

Definitions

All percentages, ratios, parts, and amounts used and described herein are by weight unless indicated otherwise.

Unless indicated otherwise, viscosity measurements as described herein represent Brookfield viscosity levels measured at 20° C. at a constant shear rate of 100 l/s after 3 seconds.

As used herein, the term "about" refers to +/−10%.

According to the certain aspects and embodiments, the invention relates to non-Newtonian compositions. Non-Newtonian compositions are characterized by having a non-linear correlation between shear stress and shear rate. Accordingly, they do not exert a constant coefficient of viscosity but instead exhibit viscosities that vary with the applied shear rate. Two major types of non-Newtonian fluids are shear thinning fluids, also known as pseudoplastic fluids, and shear thickening fluid, also known as dilatants. According to certain embodiments of the present invention, the compositions disclosed herein exhibit pseudoplastic properties in which their viscosity decreases with increasing shear stress.

The term "substantially devoid" refers to that amount or less of an ingredient of interest that does not have an appreciable impact on the composition or processes of this invention.

As used herein, the term "food-grade" means material that conforms to the standards for foods deemed safe for human consumption, as set forth in the *Codex Alimentarius*, produced by the *Codex Alimentarius* Commission (CAC).

Unless indicated otherwise, the amino acid contents of proteins as specified herein are calculated as the weight percent of the amino acid of interest from the collective weight of all amino acids in the protein.

Unless indicated otherwise, the of % values provided herein for carbohydrate content were calculated including the content of carbohydrates in the form of sugar and excluding the content of ethanol (which is provided separately).

Stabilizers

The invention relates in embodiments thereof to stabilizer compositions comprising protein and water at predetermined amounts. In particular, the stabilizer typically contains 15-45% ethanol, 5-27% protein and 25-65% water. For example, the composition may comprise 20-40%, 15-30%, 20-25%, 15-25%, 20-30% or 30-45% ethanol. The stabilizer may also contain 5-10%, 10-20%, 15-20%, 8-15%, 13-25%, 15-25%, 15-27% or 20-25% protein. The stabilizer may also contain 30-60%, 40-50%, 25-50%, or 45-65% water. Further, as disclosed herein, the amounts of ethanol, protein and water in the stabilizer compositions of the invention are collectively at least 85% and typically at least 90% in total of the stabilizer compositions. For example, the stabilizer may contain 90-95%, 90-98%, 95-99%, 93-95%, 90-99.5% or 97-100% in total of ethanol, protein and water.

In some aspects and embodiments, the stabilizer compositions of the invention and semisolid compositions comprising them are characterized by having a viscosity of 2-60 Pascal seconds (Pa·s) as measured using an appropriate viscometer at 20° C. at a constant shear rate of 100 l/s after 3 seconds, in the absence of gel forming agents. Exemplary viscosity ranges of the compositions disclosed herein when measured at 20° C. at a constant shear rate of 100 l/s after 3 seconds include, but are not limited to, 2-40 Pa·s, 2-30 Pa·s, 2-20 Pa·s, 5-25 Pa·s, 2-15 Pa·s, 30-50 Pa·s, and 40-60 Pa·s, including each value within the specified ranges. Typical viscosities of the compositions of the present invention when measured at 20° C. at a constant shear rate of 100 l/s after 3 seconds include, but are not limited to, about 2 Pa·s, about 5 Pa·s, about 10 Pa·s, about 15 Pa·s, about 20 Pa·s, about 25 Pa·s, about 30 Pa·s, about 35 Pa·s, about 40 Pa·s, about 45 Pa·s, about 50 Pa·s, about 55 Pa·s, or about 60 Pa·s, with each possibility representing a separate embodiment. Viscosity can be measured as is known in the art using a suitable Brookfield viscometer in a setup that is compatible for non-Newtonian pseudoplastic semisolid compositions. For example, viscosity can be measured using a Brookfield RV or LV viscometer. In some embodiments, viscosity can be measured using the two-plates model (cone and plate) in which the shear rate is the velocity of the upper plate (in meters per second) divided by the distance between the two plates (in meters). For example, without limitation, measurements may be made using a Brookfield DV-II+Pro viscometer with a cone (4°, 4-cm diameter) and cylinder geometry. It is to be understood that other setups known to those of skill in the art are also contemplated within the scope of the present invention.

In various embodiments, the stabilizer is capable of enhancing the resistance of a semisolid composition (e.g. food product) to phase separation resulting from shear stress or agitation, enhancing the freeze-thaw stability of a semisolid composition (e.g. food product) and/or enhancing the viscosity of a semisolid composition (e.g. food product), wherein each possibility represents a separate embodiment of the invention.

In some embodiments the stabilizer imparts resistance of a semisolid food product to phase separation resulting from shear stress or agitation. Accordingly, compositions comprising the stabilizers of the invention advantageously exert improved shear stress stability. When the compositions are shear-thinning or pseudoplastic, their internal structure is typically broken down as stress is applied. Although this structural deformation is considered reversible, when applying stress values that exceed the yield point, at least a fraction of the deformation is permanent and non-reversible. Without being bound by any theory or mechanism of action, the stabilizer increases the yield stress values at which this irreversible deformation occurs. Thus, the compositions are more resistant to higher shear stress or agitation.

In some aspects and embodiments, the stabilizer is capable of enhancing the freeze-thaw stability of a semisolid food product. As used herein, the term "freeze-thaw stability" refers to a property of e.g. a food product that shows a resistance to deterioration and phase separation after repeated temperature cycling. When temperature fluctuations of a semisolid food product occur, they typically result in several undesirable effects, including moisture migration, dehydration, syneresis, structural breakdown, and the formation of large ice crystals which impart a gritty mouthfeel to frozen foods. The stabilizer according to embodiments of the present invention imparts resistance to the aforementioned undesirable effects such that they can withstand multiple freeze-thaw cycles, for example 2 to 10 cycles, without losing their consistency, homogeneity, and texture. In some embodiments, the freeze-thaw cycles are performed to room temperatures thereby obtaining complete defrosting of the product. In other embodiments, the freeze-thaw cycles are performed to temperatures in the range of about 5° C. to about 15° C., without achieving complete thawing of the product. In yet other embodiments, the freeze-thaw cycles are performed to temperatures in which the products are intended to be consumed.

In certain embodiments as demonstrated herein, the stabilizers of the invention are capable of retaining or enhancing the stability of compositions (e.g. food products) subjected to multiple stress sources, including shear stress, agitation and freeze-thaw conditions.

Further, as disclosed and exemplified herein, the stabilizer compositions according to the teachings of the invention advantageously exhibit the stabilizing and viscosity-enhancing properties rheological characteristics as disclosed herein even in the absence of any added gelling agents or other stabilizers or thickening agents. As used herein, the term "gelling agent" refers to a material that is capable of increasing the viscosity of a fluid by forming a gel. Typically, gelling agents include polysaccharide gelling agents, polypeptide gelling agents as well as various polymers which can be used as gelling agents, such as carrageenan, xanthan gum, guar gum, acacia gum, locust bean gum, tara gum, tamarind gum, karaya gum, cassia gum, konjac, tracaganth, gellan, gelatin, curdlan, alginic acid, alginate, pectin, carboxymethylcellulose, methylcellulose, hydroxypropyl cellulose, hydroxypropyl methyl cellulose, ethyl cellulose, ethyl methyl cellulose, cyclodextrin, polydextrose, polyvinylpyrrolidone, polyvinyl alcohol, and polyethylene glycol. The term "thickening agents" as used herein refers to a material that is capable of increasing the viscosity of a fluid without forming a gel. Typical "thickening agents" include starches, such as acid treated starch, oxidized starch, monostarch phosphate, distarch phosphate, phosphated distarch phosphate, acetylated distarch phosphate, acetylated starch, acetylated distarch adipate, hydroxypropyl starch, hydroxypropyl distarch phosphate, starch sodium octenyl succinate, acetylated oxidized starch; lactates such as sodium lactate, calcium lactate; and celluloses such as microcrystalline cellulose.

Thus, the stabilizers of the invention are advantageously substantially devoid of polysaccharide gelling agents and polypeptide gelling agents. In another embodiment the stabilizers are devoid of polysaccharide gelling agents and polypeptide gelling agents. In another embodiment the stabilizers are substantially devoid of gel forming agents. In another embodiment the stabilizers are devoid of gel forming agents. In another embodiment the stabilizers are substantially devoid of gel forming agents or thickening agents. In other embodiments, the stabilizers of the invention contain less than 0.5%, 0.4%, 0.2%, 0.1%, 0.05% or 0.01% of gelling agents or of components as disclosed herein, wherein each possibility represents a separate embodiment of the invention.

According to further embodiments, the stabilizers of the invention comprise 0-10% in total of carbohydrates, fats and flavoring agents, e.g. 0-5%, 2-8%, 1-5%, 6-10%, 0.5-3% or 0.5-1%, including any range or integer in between. In another embodiment, the stabilizers consist essentially of ethanol, protein, water, and optionally one or more flavoring agents. In a particular embodiment, said stabilizer may contain 0.5-3% or 0.5-1% flavoring agents, including any range or integer in between. In some embodiments, the flavoring agents may comprise various natural and artificial compounds which contain the flavoring constituents derived from a spice, fruit juice, vegetable or vegetable juice, edible yeast, herb, bud, bark, root, leaf, fruit or similar plant material, meat, seafood, poultry, eggs, dairy products or fermentation products thereof, whose significant function in food is imparting flavoring rather than nutrition. Examples include e.g. vanillin, benzaldehyde, cinnamic acid esters (exotic fruit), cinnamaldehyde (cinnamon), eugenol (clove), methyl benzoate (dry fruit), benzyl acetate (jasmine), γ-decalactone, aliphatic and terpenic esters, and 2,3-butanedione (diacetyl).

In other embodiments the stabilizer may contain 0-1%, e.g. 0.1-1%, 0.1-0.2%, 0.2-0.5%, 0.5-1% or 0.2% of additives such as coloring agents, preservatives (e.g. antimicrobial or anti-mycotic agents), sweeteners, antioxidants and acidity regulators. For example, compounds such as organic acids may be added in some embodiments. It is to be understood, however, that the additives and the amounts at which they are incorporated in the stabilizer compositions of the invention are advantageously selected such that they do not substantially alter the viscosity of the stabilizer, or its rheological properties as disclosed herein.

Optionally, stabilizers for semisolid food products may contain limited amounts (0-10%) of carbohydrates, fats and additional ingredients which are partly in the form of particulate additives. For example, in some embodiments the stabilizers may contain chunks of e.g. cookies or grains embedded in the stabilizer matrix, as long as the stabilizer maintains a continuous flowable or spreadable matrix.

Advantageously, the protein component of the stabilizer is characterized by a cysteine content of 0.7-3.5%, e.g. 1-3.5%, 1-3%, 2.7-3.5%, 1.4-2.6%, or 0.7-1.3%. In another embodiment, the protein is characterized by a branched chain amino acid (BCAA) content of 10-30% in total, e.g. 15-20%, 10-20% or 20-30%.

The compositions and ingredients used in advantageous embodiments of the invention are characterized as food-grade, e.g. food-grade proteins. Food-grade proteins include proteins from plant, animal, and microbial sources, and mixtures thereof, which are acceptable for human consumption. These food-grade proteins can be in the form of flours, typically comprising about 5-50% protein on a dry weight basis; concentrates, typically comprising up to about 65% protein on a dry weight basis; and isolates, typically comprising up to about 95% protein on a dry weight basis. As disclosed herein, advantageous manufacture processes and methods of the invention utilize food-grade proteins comprising at least 60% protein by weight, e.g. concentrates and isolates. Examples of food-grade proteins include, but are not limited to, various animal (e.g. dairy) or plant-derived protein concentrates or isolates as disclosed herein. In other embodiments, pharmaceutical- or cosmetic-grade compositions and ingredients may be used, as defined by artrecognized standards such as those defined by the United States Pharmacopeia (USP) and European Food Safety Authority (EFSA).

Exemplary proteins that are particularly advantageous for use with the compositions and methods of the invention and to potentiate the stabilizing effects of ethanol are whey proteins, soy proteins, pea proteins, rice proteins, quinoa proteins, chia seed proteins, amaranth proteins, and combinations thereof, wherein each possibility represents a separate embodiment of the invention. In another embodiment, the protein component of said stabilizer is selected from the group consisting of whey proteins, soy proteins, pea proteins and rice proteins. In a particular embodiment, the protein is a whey or soy.

As disclosed herein, the stabilizers of the invention are composed of ethanol, protein and water at predetermined amounts at which a synergistic stabilizing effect is achieved. For example, as exemplified herein, a minimal threshold is required for both protein and alcohol levels to obtain a significant viscosity enhancement, whereas excessive amounts of ethanol and/or protein result in texture impairment. As further disclosed herein, the viscosity-enhancing effect of each protein in combination with ethanol was correlated with its cysteine content. In some embodiments, this property may be used to determine the specific amounts and ratios of components within the stabilizer. In other embodiments, this may also be determined by the conditions (e.g. temperature)

For example, the stabilizer may include in particular stabilizers consisting essentially of i) 25-65% water, ii) 15-45% ethanol, iii) 13-25% whey proteins or 8-15% w/w soy proteins or 15-27% w/w pea proteins or 13-25% rice proteins, and (iv) 0-1% flavoring agents.

In other exemplary embodiments, the stabilizers may include in particular stabilizers consisting essentially of i) 25-65% w/w water, ii) 15-45% w/w ethanol, iii) 3-10% w/w of a protein characterized by a cysteine content of 2.7-3.5% w/w, or 10-18% w/w of a protein characterized by a cysteine content of 1.4-2.6% w/w, or 16-20% w/w of a protein characterized by a cysteine content of 0.7-1.3% w/w, and (iv) 0-10% in total of carbohydrates, fats and flavoring agents.

In another embodiment the stabilizer composition exhibits non-Newtonian pseudoplastic properties in the absence of added gel forming agents. In another embodiment said stabilizer is characterized by a flowable or spreadable semisolid consistency.

As further disclosed herein, the stabilizer is advantageously prepared by a process comprising:

a. providing a protein composition in solid form, characterized by up to 15% loss on drying (LOD), and containing at least 60% w/w of the protein, b. reconstituting the protein composition in an aqueous ethanol-containing fluid, to final concentrations of 25-65% w/w water, 15-45% w/w ethanol and 5-27% w/w protein.

In another embodiment said protein composition is provided in dry powder form, characterized by up to 6% LOD, e.g. up to 5% LOD. In other embodiments, said protein composition contains 70-85% of said protein, or 60-95%, 70-95%, or 65-80% of said protein.

An aqueous ethanol-containing fluid, according to embodiments of the present invention refers to an aqueous medium containing water and ethanol at a ratio of about 5:1 to about 1:5, including all iterations of ratios within the specified range. In some embodiments, the aqueous ethanol-containing fluid of the present invention consists essentially of water and ethanol at a ratio of about 5:1 to about 1:5, including all iterations of ratios within the specified range. Typical ratios of the water to ethanol in the aqueous ethanol-containing fluid of the present invention include, but are not limited to, 5:1, 4:1, 3:1, 2:1, 1:1, 1:2, 1:3, 1:4, or 1:5, with each possibility representing a separate embodiment. Typically, the fluid is a single-phase solution of ethanol and water.

In other embodiments, the reconstitution is performed under conditions (e.g. temperature) sufficient to enhance the viscosity of the resulting composition by 150-5,000 fold compared to the aqueous fluid in the absence of gel forming agents or other thickening agents. In addition, the reconstitution is typically performed under conditions that are insufficient to elicit irreversible denaturation of said protein. Further, reconstitution may conveniently be performed under conditions that are insufficient for pasteurization (due to a low temperature and/or short time). Thus, reconstitution may generally be performed at a temperature no lower than 4 and no higher than 79° C., and are preferably and typically performed at a temperature within the range of 35-79° C., e.g. 40-65° C., 50-65° C., 50-60° C. or 55-65° C. In other embodiments, the reconstitution is performed at a pH within the range of 5.5 and 8.5 and preferably 6-8, e.g. 6-7, 6.5-7.5, 7-7.5 or 7.5-8. In another embodiment reconstitution may be performed for 1-10 minutes, e.g. 1-5, 5-10, 2-8 or 3-7 minutes under the above-specified temperature and pH conditions. Typically, the pH of the resulting stabilizer compositions is within the range of 6-8.

In another embodiment, there is provided a synergistic combination of ethanol and protein, prepared by a process comprising:

a. providing a protein composition in solid form, characterized by up to 15% loss on drying (LOD), and containing at least 60% w/w of the protein, b. reconstituting the protein composition in an aqueous ethanol-containing fluid, to final concentrations of 25-65% w/w water, 15-45% w/w ethanol and 5-27% w/w protein, to obtain a synergistic combination comprising ethanol, protein and water to a total of at least 90%, characterized by viscosity of 2-60 Pa·s, measured at 20° C. at a constant shear rate of 100 l/s after 3 seconds, which is substantially devoid of polysaccharide gelling agents and polypeptide gelling agents.

According to various particular embodiments, the synergistic combination is prepared and used as stabilizers for semisolid compositions as disclosed herein.

According to various aspects and embodiments, the stabilizers of the present invention and composition comprising them can be manufactured or utilized in a batch production process as well as a continuous production process, with each possibility representing a separate embodiment. Contrary to hard solids and gel products that are mainly suitable for batch production process, the inventions enable the production and use of flowable compositions therefore being suitable for use in continuous flow processes whereby flowable materials are continuously in motion while being subjected to various process steps during manufacturing. This manner of production is more cost-effective as it allows continuous production with minimal shutdowns.

Semisolid Compositions

In other embodiments, the invention relates to alcohol-containing semisolid compositions comprising the stabilizers of the invention.

Semisolid compositions are distinguished from liquid compositions such as liquor, milk or juice and are characterized in that they have a higher viscosity and possess qualities of both a liquid and a solid. Semisolid compositions referred to in various embodiments of the invention are typically characterized by viscosity of at least 2 Pa·s, and up to about 200 Pa·s at 20° C., more typically between 2-60 Pa·s, e.g. between 2.5-30 Pa·s. Further, the semisolid compositions of the invention are typically characterized as being flowable and/or spreadable at room temperature.

The term flowability generally refers to the level of deformation of a composition against gravity. As used herein, a flowable composition is able to be transported, by gravity or by conventional mechanical or pneumatic pumping means from a storage vessel, while retaining its texture and consistency. The term spreadability generally refers to the level of deformation of a composition against stress. As used herein, a spreadable composition is easily spread and distributed approximately uniformly over a surface by applying pressure thereto (for example with a knife or a spoon at consumption) while retaining its texture and consistency. Flowable and spreadable compositions according to embodiments of the invention are distinguishable from hard solids and products such as gels that cannot be spread and/or flow at room temperature once formed without substantially altering their properties such as texture and/or consistency.

In some embodiments, the semisolid composition prepared or supplemented a stabilizer of the invention is a food product. Exemplary semisolid food products that can be prepared or modified using the stabilizers of the invention include, without limitation: condiments (e.g. ketchup or other tomato-based condiments, mayonnaise, or other aromatic preparations added to prepared food products to improve flavoring), sauces (e.g. barbecue sauce, sweety sauce or other thick sauces and dressings), confectionaries (e.g. chocolate bars, protein bars and various other alcohol-containing candies), filling (e.g. sweet or savory creams for stuffing or coating candies such as pralines and marshmallow, or pastries such as cakes, puffs, profiteroles, doughnuts, croissants and bourekas), pudding (e.g. dairy-based dessert puddings or other protein-rich puddings), cheese (e.g. cream cheese, lowfat cheese spread, soft cheese of various consistencies), spread (e.g. chocolate spread, nut spread, cheese spread), dessert (e.g. cream-based desserts) and yogurt (e.g. strained yogurt). In some embodiments, the product is a dairy product (e.g. cheese, filling or dessert). In another embodiment, said product is a non-dairy substitute thereof (e.g. soy cheese, vegan dessert). In some embodiments the product is a frozen dessert, such as an ice-cream. In yet other embodiments, ice-cream or ice-cream type products are excluded.

In another embodiment the semisolid compositions of the invention have a continuous flowable or spreadable matrix. In another embodiment the semisolid compositions of the invention exhibit non-Newtonian pseudoplastic properties in the absence of added gel forming agents.

In some embodiments, provided is an alcohol-containing semisolid food composition comprising a stabilizer, the stabilizer consisting essentially of ethanol, protein and water, wherein the composition is substantially devoid of gelling agents, comprises 3-40% w/w ethanol, 4-25% w/w protein, and 25-65% w/w water in total, and maintains a stable semisolid consistency at 20° C. for at least 24 hours, at least 48 hours or at least 72 hours, and typically for up to a week. For example, the semisolid compositions of the invention may retain a stable semisolid consistency at 20° C. for 1-7, 2-6, 3-7, or 3-5 days. In other embodiments, the compositions may maintain a stable semisolid consistency at 4° C. for at least 1-4 weeks, wherein each possibility represents a separate embodiment of the invention. Thus, in contradistinction from other non-liquid alcohol-containing food products that lose their consistency and become phase separated within less than an hour at room temperature, such that the alcohol phase becomes rapidly separated from the remaining product matrix, the invention provides for the production of semisolid alcohol-containing food products containing high levels of alcohol (as accepted for consumption in alcoholic beverages) that retain a stable semisolid consistency at room temperature for days or weeks.

In another embodiment, the compositions of the invention are characterized by viscosity of 2-60 Pa·s, measured at 20° C. at a constant shear rate of 100 l/s after 3 seconds, in the absence of gel forming agents. However, while the viscosity values characteristic of the stabilizers of the invention are typically also characteristic of the semisolid food product containing them as disclosed herein, it is possible under some embodiments to incorporate the stabilizer compositions into higher- or lower-viscosity compositions, for example for introducing alcohol into food compositions in a stabilized form.

In another embodiment, the semisolid compositions of the invention are characterized by final concentrations following addition of said stabilizer of 3-40% ethanol, 4-25% protein, 25-65% (e.g. 30-50%) water, 6-10% fat, and 17-27% carbohydrates, including any range and integer in between. In another embodiment, the compositions comprise 20-24% sugar. In another embodiment, the compositions comprise 17-27% carbohydrates, wherein the sugar portion of the carbohydrates is 20-24% of the composition. In another embodiment, the compositions comprise 7-11% fat, 4-30% protein, 17-27% carbohydrates (including 15-20% sugar), 30-48% water, and 6-15% ethanol. It should be understood that the ranges of the nutritional values provided herein are exemplary of certain advantageous embodiments of the invention. However as further disclosed and exemplified herein, it is possible to incorporate the stabilizers of the invention in food products having e.g. lower or higher levels of fat, sugar (or total carbohydrates), sodium etc., in order to incorporate alcohol in these products at a stabilized state.

In another embodiment (for example in the preparation of ice cream products), the ratio between the total protein content to ethanol in the composition is 0.6 to 3, e.g. 0.86 to 1.7 or 1.7 to 2.27. In a particular embodiment, said food product contains about 1:1 protein to ethanol by weight.

In another embodiment, the semisolid compositions of the invention contain a protein characterized as described above with respect to the stabilizers of the invention. In some embodiments, the composition comprises a food-grade protein selected from the group consisting of whey proteins, soy proteins, pea proteins, rice proteins, quinoa proteins, chia seed proteins, amaranth proteins, and combinations thereof. In certain exemplary embodiments, the composition comprises 3-20% w/w ethanol, 25-65% w/w water, 6-10% w/w fat, 17-27% w/w carbohydrates, and wherein the protein component of said stabilizer is selected from the group consisting of: (i) whey proteins, to a final concentration of 10-15%, (ii) soy proteins, to a final concentration of 3-10%, (iii) pea proteins, to a final concentration of 15-20%, and rice proteins, to a final concentration of 13-20%. Thus, the semisolid compositions of the invention may further contain in some embodiments proteins other than the protein component (e.g. soy, whey) of the stabilizer. In other exemplary embodiments, the semisolid compositions may comprise: 3-10% w/w of a protein characterized by a cysteine content of 2.7-3.5% w/w; 10-18% w/w of a protein characterized by a cysteine content of 1.4-2.6% w/w; or 16-20% w/w of a protein characterized by a cysteine content of 0.7-1.3% w/w.

In other embodiments, the invention provides an alcohol-containing semisolid composition comprising a stabilizer, the stabilizer consisting essentially of ethanol, protein and water, wherein the protein is characterized by a cysteine content of 0.7-3.5% w/w and a branched chain amino acid (BCAA) content of 10-30% w/w in total, and wherein the composition is characterized by final concentrations, following addition of said stabilizer, of 3-40% w/w ethanol, 4-25% w/w of the protein, and 25-65% w/w water, 6-10% w/w fat, and 17-27% w/w carbohydrates, by a flowable or spreadable semisolid consistency, and by viscosity of 2-60 Pa·s, measured at 20° C. at a constant shear rate of 100 l/s after 3 seconds, in the absence of gel forming agents.

Methods of Producing Semisolid Compositions

In other embodiments the invention relates to methods for producing an alcohol-containing semisolid composition as disclosed herein, by incorporating therewith a stabilizer of the invention. In some embodiments, the methods are used for stabilizing a food product. In other embodiments, the methods are used for enhancing the viscosity of a composition.

In some embodiments, the incorporation of the stabilizers of the invention into the composition may optionally be done in-process (e.g. by combining the stabilizer or components thereof with a product mix as described herein, wherein further processing steps are optionally performed after the stabilizer is formed). In this case, the product is chosen such that the conditions for forming the stabilizer as disclosed herein are compatible with the acceptable manufacture process for the intended product, and do not impair the properties of said product. Examples for such processes include e.g. the production of various dairy products and substitutes thereof, and in particular cream-based desserts and fillings. Examples of such processes are provided e.g. in Examples 1 and 6 herein. In addition, as demonstrated herein, the stabilizer once formed may be readily inserted into a variety of products and compositions without impairing their properties, and for example are capable of modifying food products while maintaining or providing taste and texture that are desirable to the consumer. Accordingly, the food preparation techniques in accordance with aspects of the present invention are also particularly suitable for the production of certain non-sweetened, heat sensitive products (e.g., certain condiments and sauces such as salad dressings) that cannot be processed thermally without incurring undesirable flavor/quality loss or other adverse impacts on the sensory properties thereof. Examples of such modifications of pre-prepared compositions including shelf-ready food products is provided e.g. in Example 5, in which the addition of the stabilizer to the food product (e.g. chocolate pudding, cheese spread) was performed at room temperature.

In some embodiments, alcohol-containing semisolid compositions according to the principles of the invention may be prepared by a process comprising:

a. providing a composition having a flowable or spreadable continuous matrix, b. providing a stabilizer, prepared by combining 25-65% w/w water, 15-45% w/w ethanol and 5-27% w/w protein, under conditions sufficient to enhance the viscosity of the combined composition by 150-5,000 fold in the absence of gel forming agents, wherein the resulting stabilizer is characterized by viscosity of 2-60 Pa·s measured at 20° C. at a constant shear rate of 100 l/s after 3 seconds, and is substantially devoid of polysaccharide gel forming agents and polypeptide gel forming agents, and c. admixing the composition with the stabilizer to obtain a substantially uniform composition characterized by a final concentration of 3-40% w/w ethanol and 4-25% w/w protein.

Thus, while the composition into which the stabilizer is incorporated may optionally contain certain particles (such as nuts, fruit or chocolate bits), these particles are embedded in a continuous and typically substantially uniform matrix extending throughout the composition such that the composition at its entirety has a spreadable or flowable consistency as disclosed herein. Such compounds are distinguishable from e.g. dry powders or other types of particulate materials, in which the particles are not interconnected by a continuous matrix material.

As described herein, the stabilizer is prepared under conditions sufficient to enhance the viscosity of the combined composition by 150-5,000 fold in the absence of gel forming agents. As further described herein, the conditions are determined so as to obtain a stabilizer composition having a semisolid flowable or spreadable consistency at room temperature. Thus, for example, excessive heating (that may be associated with irreversible protein denaturation, e.g. over 79° C.) and insufficient heating (e.g. below 4° C.) may impair the texture and consistency of the stabilizer or composition. In other embodiments the conditions may be insufficient for pasteurization. In some embodiments, temperatures of 35-79° C., and more typically 40-65° C., are preferred, as they may provide for reduction of production costs, due to shortening the production time and/or reduced amounts of protein required for the process. In other embodiments, performing the process under these temperature ranges provides for other advantages such as obtaining a more uniform product, and reduction of microbial load.

Exemplary specific conditions suitable for obtaining a stabilizer composition of a desired viscosity using various proteins are provided throughout the Examples and disclosure herein. For example, without limitation, wherein the temperature for preparing the stabilizer is 40-65° C., the resulting composition may be characterized as follows:

a. a composition comprising 10-15% w/w whey protein, 3-20% w/w ethanol, 14-20% w/w carbohydrates, 6-10% w/w fat, and 25-55% w/w water, and characterized by a Brookfield viscosity of 2-16 Pa·s measured at 20° C. at a constant shear rate of 100 l/s after 3 seconds, b. a composition comprising 10-15% w/w whey protein, 21-40% w/w ethanol, 5-9% w/w carbohydrates, 6-10% w/w fat, and 20-40% w/w water, and characterized by a Brookfield viscosity of 5-12 Pa·s measured at 20° C. at a constant shear rate of 100 l/s after 3 seconds, c. a composition comprising 3-10% w/w soy protein, 3-20% w/w ethanol, 14-20% w/w carbohydrates, 6-10% w/w fat, and 40-65% w/w water, and characterized by a Brookfield viscosity of 3-13 Pa·s measured at 20° C. at a constant shear rate of 100 l/s after 3 seconds, d. a composition comprising 15-20% w/w pea protein, 3-20% w/w ethanol, 15-20% w/w carbohydrates, 6-10% w/w fat, and 35-60% w/w water, and characterized by a Brookfield viscosity of 2-20 Pa·s measured at 20° C. at a constant shear rate of 100 l/s after 3 seconds, or e. a composition comprising 13-20% w/w rice protein, 3-20% w/w ethanol, 14-20% w/w carbohydrates, 6-10% w/w fat, and 35-60% w/w water, and characterized by viscosity of 2-20 Pa·s measured at 20° C. at a constant shear rate of 100 l/s after 3 seconds.

In other embodiments, the invention relates to the use of ethanol for stabilizing food products, in which a stabilizer of the invention is formed by admixing ethanol and optionally a food-grade protein as disclosed herein with the product of pre-mix thereof. The amounts and conditions applied in this process are determined such that the viscosity of said product or pre-mix is enhance by at least 0.5 Pa·s and to at least 2 Pa·s measured at 20° C. at a constant shear rate of 100 l/s after 3 seconds. Unexpectedly, the present invention discloses that by incorporating ethanol under the conditions specified herein, the resistance of said product to shear stress and/or enhance the freeze-thaw stability of said product is thereby enhanced.

Thus, in another embodiment the method is used for stabilizing a food product, and comprises:

a. providing a food product having a continuous flowable or spreadable matrix, or a pre-mix thereof, b. admixing ethanol and optionally a food-grade protein with the product or pre-mix, in amounts and under conditions so as to enhance the viscosity of said product or pre-mix by at least 0.5 Pa·s and to at least 2 Pa·s measured at 20° C. at a constant shear rate of 100 l/s after 3 seconds, to thereby enhance the resistance of said product to shear stress and/or enhance the freeze-thaw stability of said product.

In some embodiments, the method comprises admixing a food grade protein as described and characterized herein with respect to the stabilizers of the invention, with ethanol and the product or mix thereof. For example, the protein may be characterized by a cysteine content of 0.7-3.5% (e.g. 1-3.5%) w/w and/or a total BCAA content of 10-30% (e.g. 15-25%) w/w.

According to particular embodiments, the protein may be selected from the group consisting of whey proteins, soy proteins, pea proteins, rice proteins, quinoa proteins, chia seed proteins, amaranth proteins, and combinations thereof. For example, the ethanol and protein may be added to final concentrations of 3-40% w/w ethanol, 4-25% w/w of the protein, and 25-65% w/w water. In other embodiments, the ethanol and protein are added at amounts so as to produce a semisolid composition of the invention. In other embodiments, for example when such protein (e.g. whey or soy) is already present in the food product or premix prior to addition of ethanol (at amounts sufficient to enhance the viscosity of said product or mix following addition of ethanol by at least 0.5 Pa·s and to at least 2 Pa·s as disclosed herein), ethanol is added in the absence of protein.

In another embodiment, the method is used for enhancing the viscosity of a composition, and comprises:

a. providing a first composition having a continuous matrix in the form of a liquid or a semisolid, or a pre-mix thereof, b. admixing the first composition or pre-mix with 3-40% w/w ethanol and optionally up to 25% w/w of a protein characterized a cysteine content of 0.7-3.5% w/w, at a temperature of 40-65° C., to obtain a substantially uniform second composition, wherein the second composition is characterized by final concentrations of 3-40% w/w ethanol, 4-25% w/w protein, 25-65% w/w water, 6-10% w/w fat, and 17-27% w/w carbohydrates, by non-Newtonian pseudoplastic rheology, and by enhanced viscosity compared to said first composition.

Thus, the methods of the invention may advantageously be used for enhancing the viscosity of liquid compositions to produce a semisolid composition of the invention.

In another embodiment of the methods of the invention, the protein is provided in solid form, characterized by up to 15% loss on drying (LOD), and which contains at least 60% w/w of said protein.

In another embodiment, the protein is selected from the group consisting of whey proteins, soy proteins, pea proteins, rice proteins, quinoa proteins chia seed proteins, amaranth proteins, and combinations thereof.

In another embodiment of the methods of the invention, the second or resulting composition is selected from the group consisting of:

a. a composition comprising 10-15% whey proteins, 3-20% ethanol, 14-20% carbohydrates, 6-10% fat, 22-55% water, and characterized by viscosity of 2-16 Pa·s, b. a composition comprising 10-15% whey protein, 21-40% ethanol, 5-9% carbohydrates, 6-10% fat, and 20-40% water, and characterized by a viscosity of 5-12 Pa·s, c. a composition comprising 3-10% soy protein, 3-20% ethanol, 14-20% carbohydrates, 6-10% fat, and 40-65% water, and characterized by a viscosity of 3-13 Pa·s, d. a composition comprising 15-20% pea protein, 3-20% ethanol, 15-20% carbohydrates, 6-10% fat, and 35-60% water, and characterized by a viscosity of 2-20 Pa·s, and a composition comprising 13-20% rice protein, 3-20% ethanol, 14-20% carbohydrates, 6-10% fat, and 35-60% water, and is characterized by viscosity of 2-20 Pa·s.

In another embodiment, the methods of the invention are used in a continuous production process. In another embodiment the methods of the invention are used in a batch production process.

Powder mixers can be classified as batch and continuous mixers with batch being by far the most commonly used in the food industry. Batch mixing is the traditional form of mixing. Its advantages include the following. Feeding is relatively easy. It is just a matter of weighing out each component and placing them in the mixer, which will mix them all together. Automation is simple, and batch mixers are also more versatile with regard to the number of ingredients that can be mixed. Batch mixers are also versatile with regard to how often the mix recipe is changed.

In a continuous mixing process, the ingredients are continuously fed into and through the mixer to continuously produce mixed product. Continuous mixers are basically accurate ingredient feeders, which feed the ingredients into a small mixing chamber. The accuracy of the ingredient feeders is critical as they will have a major influence on mixture quality. Continuous mixers have many advantages including: much smaller mixing equipment is required (even high throughput continuous mixers are compact); short residence time in mixer (as there is always only a small amount of material being mixed in the mixer at any time); mixing is simpler; less likely to have segregation problems.

Examples of mixing equipment amenable for use in the processes of the invention include e.g. cone screw blender, counter-rotating, dispersion mixers, double cone blender, double planetary, drum blenders, high shear rotor stator, high speed blenders, horizontal mixer, hot/cold mixing combination, intermix mixer, jet mixer, mobile mixers, Nauta conical screw mixer, paddle, planetary mixer, plough, ribbon blender, screw blender, Stephan mixer, turbomixer, twinscrew continuous blender, V blender, and vertical mixer. Additional equipment amenable for use in the context of the invention includes e.g. homogenizers, high shear mixers batch, high shear in line mixer colloid mill, tanks of various sizes (e.g. closed with controlled vacuum, heating cooling, explosion proof), and pumps (e.g. explosion proof).

Various industrial processes exemplifying the use of such equipment and specific batch production and continuous production processes are disclosed e.g. in Principles and applications, edited by P. J. Cullen. 2009 Blackwell Publishing Ltd pp 280-284.

Exemplary Ingredients for Food Products

The term alcohol, as used herein, can be either pure ethyl alcohol or the blend of ethyl alcohol, water, and/or other flavors. For example, the alcohol source can be a mixed drink, having an alcohol and a water based mixer. Suitable alcohol sources include but are not limited to scotch, rye, vodka, gin, rum, whiskey, beer, wine, champagne, liqueur, etc. However, when the amount of alcohol is referred to herein (e.g. in weight percentile of the total composition), it is intended to refer specifically to the amount of ethyl alcohol. Typically, and conveniently, said alcohol source used in the processes of the invention comprises at least about 40% ethyl alcohol by weight, e.g. at least about 85% ethyl alcohol. Accordingly, when the use of an alcohol source containing less than 20% ethanol is desired (e.g. beer or wine), it is typically mixed with an alcohol source containing above 40% ethanol, such that the required alcohol content is obtained in the final product.

Stabilizers have an ability to interact with water through hydration and swelling which enables them to occupy a large solution of volume and, as a result, reduce the amount of free water in the frozen dessert product mixture. This effect retards ice crystal growth during storage and also provides resistance to melting. This results in the rheological characteristics of the solutions being greatly modified. Stabilizers may include for example Locust bean gum (LBG), iota carrageenan, guar gum, carboxymethyl cellulose (CMC), and gelatin. Examples of additional stabilizers include e.g. carob, alginates, and agar.

An emulsifier is a substance that produces a stable suspension of two liquids that do not mix naturally, for example, oil and water. They promote fat destabilization by lowering the fat/water interfacial tension in the mix, which results in protein displacement from the fat globule surface, which in turn, reduces the stability of the fat globule thereby allowing for partial coalescence during the whipping and freezing process. This leads to the formation of a structure of the fat in the frozen product that contributes a great amount to the texture and meltdown properties. Suitable emulsifiers include manufactured-mono and diglycerides, sorbitan esters and natural egg yolk.

In some embodiments, the amounts of stabilizers (and in particular gel-forming agents) and/or emulsifiers in food products may be reduced by incorporating the novel stabilizers of the invention. In some embodiments, the food product contains less than 0.8%, 0.5%, 0.4%, 0.2% or 0.1% stabilizers and/or emulsifiers, wherein each possibility represents a separate embodiment of the invention. In a particular embodiment, the food products of the invention are substantially devoid of gelling agents, thermoreversible gums, natural or synthetic digestible gums, and/or gums which contributes to the formation of a thermoreversible gel.

Dairy products may include milk, skim milk, fresh cream, butter, dairy fat (butter oil), skim milk powder and whole milk powder, which are used in large amounts primarily in ice cream desserts.

Vegetable oils such as coconut oil, palm oil, rapeseed oil and cocoa butter may be used in various products due to considerations of shelf-life, stability, taste and cost, and may be used in food compositions for the purpose of intensifying flavor.

Sweeteners may be added to impart sweetness, and there may be used low sweetness sweeteners such as sucrose, maltose, glucose, invertose, mixed sugar solutions and starch syrup, which also have effects of enhancing the texture, as well as high sweetness sweeteners such as aspartame and stevia, for the sole purpose of imparting sweetness.

In some embodiments it is particularly desirable to provide a product having a fruit or vegetable flavor. The fruit flavor may be provided by including one or more fruit or ingredients in the product, non-limiting examples of which include fresh fruits, frozen fruits, fruit purees, frozen fruit purees, juices, frozen juices, puree concentrates, frozen puree concentrates, juice concentrates, and/or frozen juice concentrates. Such ingredients are well known to those of ordinary skill in the art.

Other ingredients which also may be added include other flavorings (e.g., chocolate, vanilla, strawberry, etc.); natural or artificial sweeteners, sugars, or corn syrups; vegetable purees or vegetable juices; natural or artificial preservatives; soluble or insoluble fiber; and/or nutritional additives such as vitamins, minerals, and herbal supplements. According to further embodiments, the natural flavoring is extracted from apple, cherry, green tea, cinnamon, clove, black tea, plum, mango, date, watermelon, coconut, pear, jasmine, peach, fennel, lychee, mint, chocolate, coffee, cream, banana, almond, grape, strawberry, blueberry, blackberry, pine, kiwi, sapote, taro, lotus, pineapple, orange, lemon, melon, licorice, vanilla, rose, osmanthus, ginseng, spearmint, citrus, cucumber, honeydew, walnut, honey, and combinations thereof.

Food products may also contain proteins of various sources. For example, whey protein is a by-product when cheese is produced from milk. After suitable pre-treatment well known to persons skilled in the art, milk is generally treated with a suitable culture to produce curd which is subsequently separated from the remaining liquid, namely dairy whey, and used to make dairy desserts. It is known that whey contains useful proteins, generally known as dairy whey proteins. It is also known that the principal proteins in such whey are β-lactoglobulin and -lactalbumin. Other proteins include serum derived immunoglobulins. Proteose peptones are also present. Such whey usually contains about 12% protein by weight on a total solids basis. In the present invention it is usually dry total whey solids or whey powder, which contain at least about 60% protein by weight, which is used as a food ingredient rather than or original fluid whey.

Food products may also contain various other food-grade proteins derived from e.g. animal sources or isolated from plant or other vegan sources, for example, protein derived from animal: milk (dairy proteins including whey), eggs, meats (e.g. bone broth proteins), insect and fish; protein isolated from plant material: soybeans, chickpeas, quinoa, lentils, beans and the like.

Other ingredients that can be used may include various liquids, including milk substitutes. Examples include e.g. soy drink, almond drink, coconut drink, rice milk, almond milk, plant milk substitutes (e.g. peas, lentils) and juices (e.g. fruit juices, clear juices).

Cream substitutes may include e.g. coconut oil, olive oil, almond oil, avocado, canola oil, vegetable oil, sweet cream, and vegetable sour cream substitutes.

Other embodiments, which are particularly useful in the production of the compositions and methods of the invention, are described below.

EXAMPLES

Materials and Methods

Ingredients

Protein powders used in the experiments below included Whey powder, ISO Whey powder, soy powder, pea powder, rice powder, and protein combination powder, and are characterized below.

Whey powder (Hadassa Bymel, Pharmacy & Nature) contains whey protein concentrate, and is characterized by 75% w/w protein, 14.6% w/w carbohydrates, and 4.5% w/w fat.

ISO whey protein (Super Effect) contains whey protein isolate, emulsifier (soy lecithin), sucralose, flavors and anti-caking agent (silicon dioxide), and is characterized by 88.1% w/w protein, 2% w/w carbohydrates, and 2.5% w/w fat.

Soy powder (Hadassa Bymel, Pharmacy & Nature), contains soy protein isolate, and is characterized by 84.6% w/w protein, 1.7% w/w carbohydrates and 1.6% w/w fat.

Pea protein powder (Cosucra) is characterized by 81.7% w/w protein, 3.2% w/w carbohydrates, and 4% w/w fat.

Rice protein powder (Nutri-Care) further contains dextrose, taste enhancers, and anticaking agent (silicon dioxide) and is characterized by 70% w/w protein, 15.7% w/w carbohydrates, and 5.2% w/w fat.

Protein powder of 5 protein sources (pea, brown rice, quinoa, chia seed and amaranth, obtained from Sunwarrior) is characterized by 80% w/w protein, 8% w/w carbohydrates and 8% w/w fat.

The amino acid content of the various protein powders is presented in Table 1 below.

TABLE 1 amino acid content of protein powders.

| Amino Acid | Protein | | | | | |
| | Soy | Whey | ISO Whey | Pea | Rice | Combi-nation |
| | | | Amount (% w/w) | | | |
| Essential amino acids | | | | | | |
| Isoleucine | 3.42 | 6.21 | 6.012 | 4.5 | 2.88 | 4.32 |
| Leucine | 7.51 | 10.38 | 9.018 | 8.4 | 6.11 | 7.19 |
| Lysine | 5.39 | 9.27 | 7.815 | 7.2 | 2.56 | 4.29 |
| Methionine | 1.28 | 2.18 | 1.803 | 1.1 | 1.92 | 1.85 |
| Phenylalanine | 3.86 | 3.12 | 2.606 | 5.5 | 3.85 | 3.27 |
| Threonine | 2.87 | 6.8 | 6.815 | 3.9 | 2.6 | 3.79 |
| Tryptophan | 1.51 | 1.72 | 0.803 | 1 | 0.77 | 1.19 |
| Valine | 4.07 | 5.85 | 5.412 | 5 | 3.86 | 4.59 |
| Non-essential amino acids | | | | | | |
| Histidine | 2.68 | 1.7 | 1.103 | 2.5 | 1.62 | 1.88 |
| Alanine | 3.52 | 4.91 | 5.212 | 4.3 | 4.11 | 3.86 |
| Arginine | 6.64 | 2.2 | 1.803 | 8.7 | 5.82 | 4.34 |
| Aspartic acid | 10.33 | 10.78 | 10.121 | 11.5 | 5.93 | 7.22 |
| Cysteine * | 2.63 | 2.45 | 2.103 | 1 | 1.23 | 2.1 |
| Glutamic acid | 16.52 | 17.33 | 13.827 | 16.8 | 12.91 | 1.3 |
| Glycine | 3.38 | 1.67 | 1.703 | 4.1 | 2.9 | 2.63 |

TABLE 1-continued amino acid content of protein powders.

| Amino Acid | Protein | | | | | |
| | Soy | Whey | ISO Whey | Pea | Rice | Combi-nation |
| | | | Amount (% w/w) | | | |
| Proline | 4.47 | 5.87 | 5.612 | 4.5 | 3.4 | 5.02 |
| Serine | 4.56 | 4.94 | 4.209 | 5.3 | 3.56 | 3.89 |
| Tyrosine | 3.15 | 2.62 | 2.206 | 3.8 | 3.94 | 1.38 |

* The cysteine content used herein may also represent cystine.

The alcohol used in the experiments described below was in the form of 96% ethanol, wherein the percentage of net ethanol from the final composition is presented in the tables. Additional experiments performed wherein the ethanol source was in the form of different alcohol-containing beverages (e.g. vodka, whiskey) provided similar results, depending on the net content of ethanol in the composition.

Viscosity Measurements

The viscosity was measured using a viscometer (BROOKFIELD DV-II+Pro) with a cone (4°, 4-cm diameter) and plate geometry. The measurement was made at room temperature (20° C.) using a constant shear rate of 100 l/s for 120 seconds. Average viscosity rate was sampled every second, but for comparative purposes between the different experiments, the rates measured after 3 seconds were used as benchmark. Each experiment was carried out in triplicate and the results were averaged, and are presented as Pa*sec.

In all tests in which a viscosity lower than 200 millipascal (mPa) was measured, indicating that the product has a viscosity very close to that of water, the maximum viscosity measured over the entire 120 seconds period was recorded.

Example 1: Alcohol Stabilizes the Texture and Increases the Viscosity of Food Products in the Presence of Added Whey Protein Powder A cream-type food product was prepared with or without various concentrations of alcohol, and with 15% added whey powder. Ingredients were stirred using a food processor (Ninja model) at 1,000-1,500 Watts (one mixing at Ninja), as follows:

1. Milk was heated to 40° C.
2. Cream was added and heated up to 60° C.
3. Sugar and flavoring agents were added to the mix, with or without stabilizers (as detailed below), and heated to 85° C., with constant stirring.
4. Protein powder and alcohol were added to the mix, under "hot" or "cold" conditions (as detailed below). The mix was constantly stirred for a 1-10 minutes while maintaining a constant temperature throughout this process. For adding the alcohol and protein under "cold" conditions, the mixture was pre-cooled in the refrigerator at 4-8° C. for a 3-8 hours to reach the desired temperature. The alcohol and protein were then added to the mixture with continuous stirring for a 1-10 minutes. Then, the mix was poured into cold small glass vessels (refrigerated overnight prior to testing).
5. The mix was aged by refrigerated storage at about 4-8° C. for about 8-12 hours.
6. The vessels were taken out of the refrigerator for a few hours to allow the mix to reach room temperature for viscosity measurement.

"Hot" preparation temperatures:

Protein powder was added at a temperature of between 60-70° C.,

Alcohol was added at a temperature of between 50-65° C. (end of mixing with protein), The temperature of the mix at the end of the process was 40-65° C. (end of mixing with alcohol).

"Cold" preparation temperatures:

Protein powder was added at a temperature of between 4-28° C.,

Formulation III: (15% Alcohol)

Nutritional values for 100 grams (gram): 8 fat, 17 sugar, 15 alcohol, 15 protein, 39.0162 water.

Ingredients per 100 grams (gram): 31.74 milk, 16.39 cream, 17.17 sugar, 17.62 alcohol, 18.16 powdered whey protein, 0.5 flavoring agent, 0.4 stabilizers.

TABLE 2 viscosity of food products comprising whey protein and varying alcohol content.

| Nutritional values and ingredients | Amount (%) | | | | | | | |
|---|---|---|---|---|---|---|---|---|
| Fat | | | | 8.00% | | | | |
| Sugars | | | | 17.00% | | | | |
| Flavoring agent | | | | 0.50% | | | | |
| Protein (whey) | | | | 15.00% | | | | |
| Water | 53.28% | 51.85% | 45.67% | 39.02% | 34.27% | 29.51% | 24.76% | 15.25% |
| Alcohol | 0% | 1.5% | 8% | 15% | 20% | 25% | 30% | 40% |
| Other nutritional values ** | 6.72% | 6.65% | 6.33% | 5.98% | 5.73% | 5.49% | 5.24% | 4.75% |
| | Viscosity (Pa*sec) after 3 sec | | | | | | | |
| "Hot" 0.40% stabilizers | 1.884 | 1.939 | 7.307 | 9.363 | 11.532 | 14.137 | 10.048 | 7.222 |
| No stabilizers | 0.115 | 0.182 | 1.440 | 7.888 | 16.000 | 15.440 | 13.687 | 4.677 |
| "Cold" 0.40% stabilizers | 1.287 | 0.848 | 0.967 | 21.005 | 40.074 | 29.533 | 12.105 | Phase separation |
| No stabilizers | 0.107 | 0.103 | 0.208 | 21.823 | 29.347 | 17.029 | 6.528 | Phase separation |

\* When mentioned herein, indicates total protein content in composition-15%, average whey protein content in composition-13.5%.

\*\* Other nutritional values mentioned herein include the remaining nutritional values that are present at low amounts, such as cholesterol, sodium, potassium and other known minerals, vitamins, dietary fiber and the like.

\*\*\* The calculation of nutritional value to 100% in the tables is done without considering the contribution of stabilizers and flavoring agents, which are present at low amounts.

Alcohol was added at a temperature of between 6-30° C. (end of mixing with protein), The temperature of the mix at end of the process was 8-32° C. (end of mixing with alcohol).

Table 2 presents the viscosity of several experiments of various product formulations, prepared with constant contents of 8% w/w fat, 17% w/w sugar, 0.5% w/w flavoring agent 15% w/w protein, 0-40% w/w contents of alcohol, 0.4% or 0% w/w stabilizers, and 53.28-15.25% w/w water, wherein the water content was determined based on the desired content of alcohol (as the alcohol content increases the water content decreases and vice a versa). Stabilizers included Locust bean gum (LBG), iota carrageenan, and guar gum at a weight ratio of 2:1:1.

Examples of formulations prepared as described above and presented in Table 2 are:

Formulation I: (No Alcohol)

Nutritional values for 100 grams (gram): 8 fat, 17 sugar (sucrose), 0 alcohol, 15 protein, 53.275 water.

Ingredients per 100 grams (gram): 49.41 milk, 15.08 cream, 17.17 sugar, 17.42 powdered whey protein, 0.5 flavoring agent, 0.4 stabilizers.

Formulation II: (8% Alcohol)

Nutritional values for 100 grams (gram): 8 fat, 17 sugar, 8 alcohol, 15 protein, 45.672 water.

Ingredients per 100 grams (gram): 40 milk, 15.78 cream, 17.17 sugar, 8.3 alcohol, 17.81 powdered whey protein, 0.5 flavoring agent, 0.4 stabilizers.

The results indicate that under certain conditions, and using predetermined combinations of ingredients, compositions manifesting semisolid, viscous and flowable properties were produced, when combining alcohol and whey protein with the composition, compared to addition of whey powder alone.

As can be seen in Table 2 and FIG. 1, increase in alcohol content surprisingly elevated the viscosity of the product in a dose-dependent manner. The viscosity increased up to a certain threshold of alcohol, after which the enhancement in viscosity begins to decrease. Above 40% alcohol content resulted in phase separation under "cold" conditions and in a gritty texture not suitable for edible commercial products under "hot" conditions. Water content also plays an important role in this system and in the final texture achieved and has a direct effect on our ability to produce uniform, stable and desired textures that the consumer will like. Low water content does not produce a smooth uniform texture and the grittiness increases as the water content was lower.

Table 2 and FIG. 1 demonstrate how alcohol acts as a stabilizer when added in the presence of whey powder under predetermined conditions, and produces a uniform texture that is more stable and more solid at high alcohol levels than the stability and uniformity that are achieved when no alcohol is used at all. Further, the results demonstrate that the stabilizing and viscosity-enhancing effects and the semisolid viscous consistency are also obtainable in the absence of any added stabilizers.

Example 2: Stabilization Against Shear Stress and Agitation

Food compositions were prepared as described in Example 1 under "hot" conditions, with or without added whey powder or ethanol. The formulations tested are provided in Table 3 below. The compositions were then subjected to agitation (shaking) and shear stress (stirring with a spoon), as well as to multiple (2-10) freeze-thaw cycles, after which they were maintained at room temperature and their texture was inspected visually.

under "hot" conditions, with stabilizers and varying content of whey protein and alcohol.

Table 4 presents the viscosity of several experiments with formulations containing 8% w/w fat, 17% w/w sugar, 0.5% w/w flavoring agent, 0.4% w/w stabilizers, 0-15% w/w alcohol, 67.13-44.52% w/w water, and 3-16% w/w protein.

TABLE 4 viscosity of food products comprising varying content of whey protein and alcohol.

| Nutritional values and ingredients | Amount (%) | | | | | | | |
|---|---|---|---|---|---|---|---|---|
| Fat | 8.00 | | | | | | | |
| Sugar | 17.00 | | | | | | | |
| Flavoring agent | 0.50 | | | | | | | |
| Protein (whey) | 3 | | 8.00 | | 15.00 | | 16.00 | |
| Alcohol | 15.00 | 0.00 | 8.00 | 0.00 | 8.00 | 0.00 | 8.00 | 0.00 |
| Water | 52.87 | 67.13 | 53.76 | 61.36 | 45.67 | 53.28 | 44.52 | 52.12 |
| Stabilizers | 0.40 | | | | | | | |
| Other nutritional values | 4.13 | 4.87 | 5.24 | 5.64 | 6.33 | 6.72 | 6.48 | 6.88 |
| Viscosity (Pa*sec) after 3 sec | | | | | | | | |
| Phase separation | 1.796 | 1.687 | 1.632 | 5.101 | 1.922 | 10.998 | 3.138 | |

TABLE 3

Formulations used for stability tests of food products

| Nutritional values and ingredients | Amount (%) | | |
|---|---|---|---|
| Figure | 2A | 2B | 2C |
| Fats | 8.00% | | |
| Sugars | 17.00% | | |
| Coffee | 0.50% | | |
| Type of powder | None | | Whey |
| Protein | 4.00% | | 15.00% |
| Protein from powder | 0.00% | | 13.00% |
| Water | 59.19% | 45.67% | 53.28% |
| Alcohol | 8.00% | | 0.00% |
| Stabilizers | 0.80% | | 0.00% |
| Other nutritional values | 3.81% | 6.33% | 6.72% |

FIGS. 2A-2C demonstrate the remarkable stability to shear stress and agitation provided according to the teaching of the present invention. It can be seen that addition of alcohol to the cream mix together with whey powder under the specific conditions kept the product stable and uniform at room temperature for a week (FIG. 2B). In contradistinction, an alcohol-containing cream prepared without the addition of whey powder exhibited phase separation a few hours after exposure to room temperature, despite the presence of commercial stabilizers (FIG. 2A). Further, a product prepared with whey protein in the absence of ethanol was not stabilized and exhibited phase separation and sedimentation (FIG. 2C). Similar results were obtained in experiments performed while subjecting the products to shear stress and agitation alone or to freeze-thaw conditions alone.

Example 3: Effect of Protein Content on Stabilizing Properties of Alcohol

The effect of the alcohol combined with different amounts of whey protein powder on the end-product texture and viscosity was examined. The product mix was prepared as described in Example 1. All the experiments were performed As can be seen in Table 4, increasing the levels of whey protein powder added in combination with alcohol over a certain threshold, increased the viscosity remarkably. In particular, when 8% alcohol is used, at least 15% whey powder is required to enhance viscosity, whereas 8% whey powder or less did not significantly affect the viscosity. Notably, the addition of whey powder alone, without the concurrent addition of alcohol, had little to no effect on viscosity. Further, addition of high amounts of alcohol (15%) with an insufficient protein content resulted in phase separation.

Example 4: Production of Stabilizing Base Composition

In light of the findings above, a stabilizer base composition for stabilizing shelf food products was developed. The stabilizer composition, comprising specific predetermined amounts of alcohol, protein and water, and lacking any known or commercially available stabilizers, was prepared as follows:

1. Water was heated to a temperature of 65° C.
2. Whey protein was added to the heated water while stirring continuously.
3. Alcohol was added to the water and protein mix while stirring continuously.
4. The mix was stored in a refrigerator (4-8° C.) for 8-10 hours.

The vessels were then taken out of the refrigerator for a few hours to allow the mix to reach room temperature for viscosity measurement. The effect of content variations of the ingredients on the viscosity of the stabilizer base was tested. The details of the base compositions examined and the resulting viscosity values are summarized in Table 5.

TABLE 5

| | | | Composition tested | | |
|---|---|---|---|---|---|
| Nutritional values | Water | Low protein no alcohol | Low protein + alcohol | High protein, no alcohol | High protein + alcohol |
| | | | Amount ( %) | | |
| Fats | | | none | 1.25% | |
| Type of powder | none | | Whey | | |
| Protein | none | 1.00% | 1.00% | | 20.84% |
| Water | 100.00% | 98.73% | 61.53% | 73.43% | 36.23% |
| Alcohol | none | | 37.20% | 0.00% | 37.20% |
| Other | 0.00% | 0.27% | 0.27% | 4.48% | 4.48% |
| nutritional values | | | Viscosity (Pa*sec) after 3 sec | | |
| "Hot" | 0.013 | 0.009 | Phase separation | 0.057 | 3.056 |
| "Cold" | 0.013 | | | 0.057 | 1.318 |

Table 5 demonstrates the production of a stabilizing base composition comprised of water, ethanol and whey protein, characterized by a viscous semisolid consistency. As can be seen in table 5, there is a critical level of protein content, below which stabilization does not occur, and phase separation takes place with the addition of high amounts of alcohol. Adding high alcohol levels to high protein containing compositions, in particular when prepared under "hot" conditions, resulted in enhanced viscosity and enabled the production of a stabilizer composition characterized by a smooth and uniform texture. FIG. 3 shows the phase separation demonstrated by the low protein, alcohol-containing composition, wherein the protein precipitated from the solution and sunk to the bottom of the vessel.

pH measurements performed on the various compositions indicated a pH of 6.78 and 6.82 for the stabilizer base compositions prepared under "hot" and "cold" conditions, respectively, and a pH of 6.21 for the high protein, no alcohol base composition.

Example 5: Incorporation of Stabilizer Compositions in Semisolid Food Products

The stabilizer compositions prepared as described in Example 4 (high protein, with or without alcohol) were incorporated into a cream-cheese type spread (Table 6) and into a chocolate pudding (Table 7). The stabilizer compositions were prepared under "hot" conditions, and admixed with the tested semisolid food products at room temperature.

Examples of specific formulations of the stabilizer composition:

Formulation IV: Water+Protein+Alcohol without Additional Ingredients

Nutritional values for 100 grams (gram): 33.49 water, 38.78 alcohol (96%), 27.81 protein.

Ingredients per 100 grams (gram): 36.228 water, 37.199 alcohol (96%) 20.841 protein.

Formulation V: Water+Protein (without Alcohol) without Additional Ingredients

Nutritional values for 100 grams (gram): 72.27 water, 27.81 protein.

Ingredients per 100 grams (gram): 73.427 water, 20.841 protein.

Formulation VI: Water+Protein+Alcohol with Additional Cheese Spread

Nutritional values for 100 grams (gram): 55.511 water, 20 alcohol (96%), 16 protein, 3 fat.

Ingredients per 100 grams (gram): 18 water, 20.83 alcohol (96%), 14.93 whey protein, 46.55 cheese spread.

Formulation VII: Water+Protein (without Alcohol) with Additional Cheese Spread

Nutritional values for 100 grams (gram): 75.51 water, 0 alcohol, 16 protein, 3 fat.

Ingredients per 100 grams (gram): 38.82 water, 14.93 whey protein, 46.55 cheese spread.

TABLE 6

| cheese spread | | |
|---|---|---|
| Nutritional value | | Amount (%) |
| Fat | | 3.00% |
| Protein (whey) | | 16.00% |
| Water | 75.51% | 55.51% |
| Alcohol | 0.00% | 20.00% |
| Other nutritional values | 5.46% | 5.49% |
| Viscosity | 1.318 | 4.442 |

TABLE 7

| chocolate pudding | | |
|---|---|---|
| Nutritional value | | Amount (%) |
| Fat | | 1.20% |
| Protein (whey) | | 16.00% |
| Water | 72.62% | 52.62% |
| Alcohol | 0.00% | 20.00% |
| Other nutritional values | 10.18% | 10.18% |
| Viscosity | 0.151 | 0.715 |

As can be seen in Tables 6-7 and FIGS. 4A-B, addition of an alcohol-containing stabilizing base to semisolid shelf food products increases their viscosity compared to addition of a base composition containing protein and water alone. Thus, the stabilizing base enables the addition of alcohol to food products while maintaining their viscosity, texture and uniformity.

Example 6: Viscosity Alterations in Response to Alcohol and Protein from Different Sources The effect of soy protein on the end-product texture and viscosity was examined, without using stabilizers. The alcohol-containing vegan mix was prepared essentially as described in Example 1, as follows:

1. Soy drink was heated to 40° C.
2. vegetarian cream was added and heated up to 60° C.
3. Sugar and flavoring agents were added to the mix and heated to exactly 85° C., with constant stirring.
4. Soy protein powder and alcohol were added to the mix, under "hot" or "cold" conditions (as detailed above). The mix was constantly stirred for a 1-10 minutes while maintaining constant temperature throughout this process. For adding the alcohol and protein under "cold" conditions, the mixture was pre-cooled in the refrigerator at 4-8° C. for a 3-8 hours to reach the desired temperature. The alcohol and soy protein were then added to the mixture with continuous stirring for a 1-10 minutes. Then, the mix was poured into cold small glass vessels (refrigerated overnight prior to testing).
5. The mix was aged by refrigerated storage at about 4-8° C. for about 8-12 hours.
6. The vessels were taken out of the refrigerator for a few hours to allow the mix to reach room temperature for viscosity measurement.

Table 8 presents the viscosity of several experiments with constant contents of 8% w/w fat, 17% w/w sugar, 0.5% w/w flavoring agent, 8% soy protein, with 0-30% w/w alcohol, and 63.79-34.13% w/w water, wherein the water content was determined based on the desired content of alcohol. The formulations were prepared without stabilizers and under "hot" or "cold" conditions. Examples of specific formulations prepared as described above and presented in table 8 include:

Formulation VIII: (No Alcohol)

Nutritional values for 100 grams (gram): 8 fat, 17 sugar, 0 alcohol, 8 protein, 63.789 water.

Ingredients per 100 grams (gram): 45.77 soy drink, 34.02 vegetarian cream, 11.63 sugar, 7.67 soy protein powder, 0.5 flavoring agent.

Formulation IX: (8% Alcohol)

Nutritional values for 100 grams (gram): 8 fat, 17 sugar, 8 alcohol (96%), 8 protein, 55.878 water.

Ingredients per 100 grams (gram): 36.05 soy drink, 34.73 vegetarian cream, 11.93 sugar, alcohol (96%) 8.33, 8.04 soy protein powder, 0.5 flavoring agent.

Formulation X: (15% Alcohol)

Nutritional values for 100 grams (gram): 8 fat, 17 sugar, 15 alcohol (96%), 8 protein, 48.975 water.

Ingredients per 100 grams (dram): 27.55 soy drink, 35.32 vegetarian cream, 12.17 sugar, alcohol (96%) 15.57, 8.38 soy protein powder, 0.5 flavoring agent.

TABLE 8

| viscosity of food product comprising soy protein and varying alcohol content. | |
| --- | --- |
| Nutritional values and ingredients | Amount (%) |
| Fats | 8.00% |
| Sugars | 17.00% |
| Flavoring agent | 0.50% |
| Protein (soy) * | 8.00% |

TABLE 8-continued

| viscosity of food product comprising soy protein and varying alcohol content. | | | | | |
| --- | --- | --- | --- | --- | --- |
| Nutritional values and ingredients | Amount (%) | | | | |
| Water | 63.79% | 55.88% | 48.96% | 44.01% | 39.07% | 34.13% |
| Alcohol | 0.00% | 8.00% | 15.00% | 20.00% | 25.00% | 30.00% |
| Stabilizers | | | 0.00% | | | |
| Other nutritional values | 3.21% | 3.12% | 3.04% | 2.99% | 2.93% | 2.87% |
| Viscosity (Pa*sec) after 3 sec | | | | | | |
| "Hot" | 3.424 | 8.596 | 11.643 | 9.939 | Phase separation | Phase separation |
| "Cold" | 2.793 | 5.659 | 6.286 | 6.779 | 5.728 | 4.145 |

\* Total protein content in composition-8%, average soy protein content in composition-7%.

As can be seen in Table 8, the viscosity of the mixture containing soy protein increased in direct relation to its alcohol content up to a threshold of 20%, above which any increase in alcohol caused a reduction in viscosity (or in phase separation under "hot" conditions). This is similar to the results observed when using 15% whey protein. This indicates that alcohol can stabilize and create products with creamy to solid textures when activated in the presence of soy protein powder.

The effect of different protein powders on the viscosity of food product was further examined. The product mix was prepared as described in Example 1, with the following changes: the experiments were performed under "hot" conditions with varying content of different types and sources of protein powders.

Table 9 presents the viscosity of several experiments performed under hot conditions with constant contents of 8% w/w fat, 17% w/w sugar, 0.5% w/w flavoring agent, 15% w/w alcohol, 39.02-48.96% w/w water and 0% or 0.4% w/w stabilizers, with varying amounts of proteins of a different sources (Whey, Soy or ISO whey).

TABLE 9

| viscosity of food proteins prepared with various protein powders | | | | | | |
| --- | --- | --- | --- | --- | --- | --- |
| Nutritional values and ingredients | Amount (%) | | | | | |
| Fat | 8.00% | | | | | |
| Sugar | 17.00% | | | | | |
| Flavoring agent | 0.50% | | | | | |
| Type of protein powder | Whey | Soy | ISO whey | ISO whey | Whey | Whey |
| Protein | 8.00% | | 15.00% | | | |
| Water | 47.10% | 48.96% | 41.17% | 41.17% | 39.02% | 39.02% |
| Alcohol | 15.00% | | | | | |
| Stabilizers | 0.40% | 0.00% | 0.00% | 0.40% | 0.00% | 0.40% |
| Other nutritional values | 4.90% | 3.04% | 3.83% | 3.83% | 5.98% | 5.98% |
| Viscosity (Pa*sec) after 3 sec | | | | | | |
| | 1.343 | 11.643 | 2.845 | 5.254 | 7.888 | 9.363 |

As can be seen in Table 9, different types of protein powders combined with alcohol resulted in high viscosity, wherein soy protein was effective at enhancing the viscosity at lower concentrations than whey protein.

Similar experiments were performed using other plant-based proteins, including pea, and rice proteins, and for a commercially available mixture of pea, brown rice, quinoa, chia seed, and amaranth proteins, which also resulted in semisolid viscous compositions as obtained in the previous experiments. Table 10 presents the viscosity of several experiments of different proteins from plants, performed under hot conditions with constant contents of 8% w/w fat, 17% w/w sugar, 0.5% w/w flavoring agent and with 15% w/w alcohol or without alcohol, and 15% w/w of rice or pea protein, 39.41-57.04% w/w water and without stabilizers. The formulations were prepared essentially as described above with respect to the soy formulation, with the exception that water was used instead of soy-containing products.

TABLE 10

| Nutritional values and ingredients | Amount ( % ) | | | |
|---|---|---|---|---|
| Fat | 8.00% | | | |
| Sugars | 17.00% | | | |
| Flavoring agent | 0.50% | | | |
| Type of protein | Rice | | Pea | |
| Protein | 15.00% | | | |
| Water | 39.41% | 54.40% | 42.04% | 57.04% |
| Alcohol | 15.00% | 0.00% | 15.00% | 0.00% |
| Stabilizers | 0.00% | | | |
| Other nutritional values | 5.59% | 5.60%% | 2.96% | 2.96% |
| Viscosity (Pa*sec) after 3 sec | | | | |
| | 5.066 | 0.258 | 1.228 | 0.337 | viscosity of food proteins prepared with pea or rice protein powders

As can be seen in Table 10, pea and rice protein powders also resulted in semisolid viscous compositions. It was further noted, that different levels of each protein were required to achieve comparable viscosity levels. Interestingly, the viscosity-enhancing property of the different appeared to correlate with their cysteine content.

Example 7: Storage of Alcohol-Containing Food Product

The effect of storage temperature on the stability of alcohol-containing food product was examined. The alcohol-containing food products tested comprise 17% w/w sugar, 15% w/w whey powder, 8% w/w fat, 0%, 8% or 15% w/w alcohol, 53%, 46% or 39% w/w water (with respective to alcohol content), 0.5% w/w flavoring agent, and 0% or 0.4% w/w stabilizers.

Half of the product mix samples were prepared as described in Example 1, with the alcoholic mix samples stored in a refrigerator (FIG. 6A), while the other half were stored in a freezer (FIG. 6B), as follows. The alcohol-containing mix samples were refrigerated at about 4-8° C. for about 8 to 12 hours prior to aeration. Then the aged mix was placed out of the refrigerator and stirred for 1 minute, and then was aerated in an ice-cream maker (220V/50 Hz, 165 W, 32 rpm, 1.7 L, 4.3 cc) at about −25 to −40° C. for about 30 minutes to about an hour. The aerated mix samples were placed in a freezer and allowed to harden, at about −40° C. for about 4 hours, and then stored in a home freezer at about −10 to −25° C. Samples were then allowed to defrost at room temperature for viscosity measurements.

As can be seen in FIGS. 6A and 6B, the viscosity of the alcohol-containing food product was surprisingly elevated in correlation with alcohol percentage, after both refrigerator storage (FIG. 6A) and freezer storage (FIG. 6B).

Example 8: Effect of Water and Sugar Content on Product Texture

In an attempt to improve the texture of the compositions containing high levels of alcohol, the level of water was increased at the expense of various other components. The product mix was prepared as described in Example 1, with the following changes: the experiments were performed under "hot" conditions with varying content of sugar. It was found that decreasing the sugar content concomitantly with increasing the water content improved the texture of the product, as shown in Table 11.

TABLE 11 formulations with high alcohol content.

| Nutritional values and ingredients | Amount (%) | | |
|---|---|---|---|
| Fat | | 8.00% | |
| Sugar | 17.00% | 7.00% | |
| Flavoring agent | | 0.50% | |
| Protein (whey) | | 15.00% | |
| Water | 24.76% | | 34.28% |
| Alcohol | 30.00% | 40.02% | 30.00% |
| Stabilizers | | 0.40% | |
| Other nutritional values | 5.24% | 5.22% | 5.72% |
| Viscosity (Pa*sec) after 3 sec | 11.960 | 6.970 | 6.428 |

As can be seen in Table 11, 30-40% alcohol content combined with lower sugar content (7%) and higher water levels resulted in viscosity similar to the viscosity of 40% alcohol in Table 1 (with 17% sugars). However, opposed to the gritty texture of the mix in Table 1, lower sugar content in combination with high alcohol content (30-40%), resulted in creamy and desirable texture, suitable for commercial use.

Example 9: Temperature for Alcohol and Protein Addition

The product mix was prepared as described in Example 1, with the following changes: all the experiments were performed with stabilizers, with varying temperatures for addition of alcohol and protein, and constant protein and alcohol content. Table 12 presents the viscosity of several experiments with constant contents of 8% w/w fat, 17% w/w sugar, 0.5% w/w flavoring agent, 15% w/w protein, 8% w/w alcohol, 45.67% w/w water, 0.4% w/w stabilizers, and varying temperatures at which the protein or alcohol components were added to the mix.

TABLE 12

| viscosity of food products prepared at different temperature conditions. | | | | |
| --- | --- | --- | --- | --- |
| Nutritional values and ingredients | Amount ( % ) | | | |
| Fat | 8.00% | | | |
| Sugar | 17.00% | | | |
| Flavoring agent | 0.50% | | | |
| Protein (whey) | 15.00% | | | |
| Water | 45.67% | | | |
| Alcohol | 8.00% | | | |
| Stabilizers | 0.40% | | | |
| Other nutritional values | 6.33%s | | | |
| Protein addition temperature (° C.) | 63 | 65 | 66 | 10 |
| Alcohol addition temperature (° C.) | 27 | 57 | 65 | |
| Viscosity (Pa*sec) after 3 sec | 6.630 | 1.089 | 7.307 | 1.238 |

Table 12 surprisingly shows that when alcohol and protein are added at a proximate temperature of about 60° C. ("hot" conditions), the viscosity is higher than the viscosity of a mix prepared while using different temperature ranges for the addition of alcohol and protein (namely, when one component is added under "hot" conditions and the other is added under "cold" conditions).

Another experiment comparing the effect of the temperatures used in this process on the texture and stability of the mix was performed.

Half of the product mix samples were prepared as described in Example 1 (FIG. 7A), while the other half were prepared using different temperatures (FIG. 7B), as described herein:

1. Milk, cream, flavoring agent and sugar were heated to between 80-85° C.
2. Protein powder was added and reheated to 80-85° C., with constant stirring.
3. The mixture was transferred to a blender.
4. Alcohol was added to the mix at 65° C. The mix was constantly stirred for a 1-10 minutes while maintaining a constant temperature throughout this process.
5. The mix was poured into small glass vessels.

As can be seen in FIG. 7A, the texture of the mix produced according to the process described in Example 1, where the average temperature of the process is about 60° C., is smooth and creamy, without any grittiness. FIG. 7B however, demonstrates a gritty, inconsistent, lumpy texture of the mixture produced under the conditions above, employing high temperatures in this process.

Example 10: Effects of the Source and Content of Protein in the Protein Powder The composition was prepared essentially as described in Example 4 under both "hot" and "cold" conditions. As a source of added protein, a chocolate-flavored protein drink powder based on pea protein and containing less than 60% w/w protein was used. The powder contains 53% pea powder, almond milled, coconut sugar, cocoa powder (8%), and thickening agent (xanthan gum), and is characterized by 50.5% Protein, 3% water, 27% carbohydrate (of which 15% is sugars), 14% fat, and 5.5% fiber. The resulting compositions were characterized by 15-20% protein, 15-25% alcohol and 36-47% water. However, in contrast to the smooth and uniform texture achieved in Example 4, the formulations produced in this experiment resulted in a granular irregular texture, undesirable for consumption.

The experiment was also repeater using collagen powder as the protein source. The composition was prepared essentially as described in Example 4 under "hot" conditions. The results are presented in Table 13.

TABLE 13

| viscosity of base compositions prepared with collagen | | |
| --- | --- | --- |
| Type of powder | Collagen | |
| Protein | 36.85% | |
| Water | 63.15% | 40.15% |
| Alcohol | 0.00% | 23.00% |
| Other nutritional values | 0.05% | 0.00% |
| Viscosity(Pa*sec) after 3 sec | | |
| | 0.065 | 0.101 |

As can be seen in Table 13, collagen, which does not contain cysteine and which is characterized by a BCAA content of 5.16%, was not effective in combination with alcohol to enhance the viscosity of the composition under the tested experimental conditions.

Example 11: Rheological Properties of Semisolid Product and Stabilizer

The viscosity of a semisolid alcohol-containing food product prepared essentially as described in Example 1, was examined in a shear-increasing protocol. The product was prepared under "hot" conditions, and contained 8% fat, 17% sugar, 0.5% flavoring agent, 15% protein, 15% alcohol, 39.02% water and 0.4% stabilizers, and the results are presented in FIG. 8.

Another experiment, designed to examine the rheology of the stabilizer base, was performed. The base mix was essentially prepared as described in Example 4, under "hot" conditions, comprising 15% protein, 35% alcohol and 45% water, and the results are presented in FIG. 9.

As can be seen in FIGS. 8 and 9, the viscosity of both compositions decreased as the shear rate increased, indicating a pseudoplastic behavior. These figures show that utilizing the teaching of the present invention, either on semisolid food products or on base stabilizers, non-Newtonian pseudoplastic properties are exhibited. As can be further seen from FIG. 9, non-Newtonian pseudoplastic properties were exhibited in the absence of added gel forming agents

The invention claimed is:

1. An alcohol-containing semisolid food composition comprising 3-40% w/w ethanol, 25-65% w/w water and protein at a concentration selected from the group consisting of 3-10% w/w soy protein and 10-18% w/w whey protein, wherein the composition maintains a stable semisolid consistency of 2-30 Pa·S at 20° C. for at least 72 hours, as determined by a Brookfield viscometer measured at 20° C. at a constant shear rate of 100 l/s after 3 seconds.

2. The composition of claim 1, which maintains said stable semisolid consistency at 4° C. for at least 1-4 weeks, as determined by a Brookfield viscometer measured at 20° C. at a constant shear rate of 100 l/s after 3 seconds.

3. The composition of claim 1, wherein said food composition is selected from the group consisting of a condiment, sauce, confectionary, filling, pudding, cheese, spread, dessert, yogurt, and pate.

4. The composition of claim 1, which exhibits non-Newtonian pseudoplastic properties in the absence of added gel forming agents.

5. The composition of claim 1, comprising 3-20% w/w ethanol.

6. The composition of claim 1, comprising 6-15% w/w ethanol.

7. The composition of claim 1, comprising 30-60% w/w water.

8. The composition of claim 6, comprising 30-60% w/w water.

* * * * *